(12) United States Patent
Mascarin et al.

(10) Patent No.: US 11,978,172 B1
(45) Date of Patent: May 7, 2024

(54) SYSTEMS AND METHODS FOR DYNAMIC INTERACTION WITH AN AUGMENTED REALITY ENVIRONMENT

(71) Applicant: EQPME INC., North York (CA)

(72) Inventors: Alexander Mascarin, Kleinburg (CA); Stephan Peralta, Etobicoke (CA); Andrea Tuzi, Innisfil (CA); Matthew David Presta, Vaughan (CA); Michael James Presta, Nobleton (CA)

(73) Assignee: EQPME INC., North York (CA)

( * ) Notice: Subject to any disclaimer, the term of this patent is extended or adjusted under 35 U.S.C. 154(b) by 0 days.

(21) Appl. No.: 18/393,990

(22) Filed: Dec. 22, 2023

Related U.S. Application Data

(63) Continuation of application No. 18/229,386, filed on Aug. 2, 2023, which is a continuation-in-part of application No. 18/316,498, filed on May 12, 2023, which is a continuation of application No. 17/984,338, filed on Nov. 10, 2022, now Pat. No. 11,688,149.

(60) Provisional application No. 63/394,716, filed on Aug. 3, 2022.

(51) Int. Cl.
*G06T 19/00* (2011.01)
*G06T 7/13* (2017.01)

(52) U.S. Cl.
CPC .............. *G06T 19/006* (2013.01); *G06T 7/13* (2017.01)

(58) Field of Classification Search
None
See application file for complete search history.

(56) References Cited

U.S. PATENT DOCUMENTS

| 5,646,844 A | 7/1997 | Gudat et al. |
| 9,070,216 B2 | 6/2015 | Golparvar-Fard et al. |
| 9,222,771 B2 | 12/2015 | Rosengaus et al. |

(Continued)

FOREIGN PATENT DOCUMENTS

| CA | 3105792 A1 | 8/2021 |
| WO | 2018060783 A1 | 4/2018 |

OTHER PUBLICATIONS

PIX4D, "Turn your mobile device into a professional 3D scanner", https://www.pix4d.com/product/pix4dcatch, downloaded May 11, 2022.

(Continued)

*Primary Examiner* — Nicholas R Wilson

(57) ABSTRACT

Methods and systems are provided for dynamic interaction with an augmented reality environment. In some embodiments, the systems and methods are directed at dynamically interacting with machinery within the augmented reality environment via an augmented reality device. The method involves analyzing a site in which the machinery is to be operated to capture environment data; displaying on the augmented reality device an augmented reality representation of the machinery as an overlay of a portion of an augmented reality environment; receiving an interaction request for interacting with the augmented reality representation of the machinery; determining whether the interaction request can be completed in respect of the machinery within the site; and in response to determining that the interaction request can be completed, displaying the augmented reality representation of the machinery in accordance with the interaction request, otherwise, indicating that the interaction request cannot be completed within the site.

30 Claims, 21 Drawing Sheets

(56) References Cited

U.S. PATENT DOCUMENTS

| | | | |
|---|---|---|---|
| 10,580,207 | B2 | 3/2020 | Pejic et al. |
| 2008/0071559 | A1 | 3/2008 | Arrasvuori |
| 2009/0061901 | A1 | 3/2009 | Arrasvuori et al. |
| 2010/0185529 | A1 | 7/2010 | Chestnut |
| 2013/0234850 | A1 | 9/2013 | Lee |
| 2014/0025481 | A1 | 1/2014 | Kang et al. |
| 2016/0049005 | A1 | 2/2016 | Mullins et al. |
| 2016/0165170 | A1 | 6/2016 | McRae |
| 2017/0116644 | A1 | 4/2017 | Huang et al. |
| 2018/0349946 | A1 | 12/2018 | Nguyen et al. |
| 2020/0258144 | A1 | 8/2020 | Chaturvedi et al. |
| 2020/0402219 | A1 | 12/2020 | Gilbert |
| 2021/0020141 | A1 | 1/2021 | Yuasa |

OTHER PUBLICATIONS

Sitemark, "Software for solar construction", https://www.sitemark.com/industries/construction/, downloaded May 11, 2022.
ThreeKit, "3D Product Configurator & Augmented Reality For Commerce", https://www.threekit.com/, downloaded Jun. 28, 2022.
JLG, "Product Announcement", May 2022.
Strange, "Now You Can Drive Elon Musk's Tesla Cybertruck in AR from the Comfort of Your Home via iOS & Android", Dec. 9, 2019, <https://mobile-ar.reality.news/news/now-you-can-drive-elon-musks-tesla-cybertruck-ar-from-comfort-your-home-via-ios-android-0216340/> retrieved on Jun. 7, 2023.
Makarov, "12 Augmented Reality Trends of 2023: New Milestones in Immersive Technology", Aug. 2, 2022, <https://mobidev.biz/blog/augmented-reality-trends-future-ar-technologies> retrieved on Jun. 19, 2023.
"On-device voice commands in AR Glasses—Vuzix", <https://vivoka.com/project/vuzix/>, Vivoka, Oct. 2021, retrieved on Jun. 7, 2023.
Echo3d, "Top 5 Augmented Reality (AR) Remote Assistance Tools", <https://medium.com/echo3d/top-5-augmented-reality-ar-remote-assistance-tools-76e830cddf99>, Medium, Jul. 22, 2021, retrieved on Jun. 7, 2023.
Virsabi, "Tesla model 3", <https://virsabi.com/tesla/> (Jul. 15, 2019), retrieved on Jun. 7, 2023.
Zero Density, "Augmented Reality—Revolutionize Your Storytelling with Augmented Reality Solutions", <https://www.zerodensity.tv/solutions/augmented-reality/> (Apr. 6, 2023), retrieved on Jun. 14, 2023.
Virsabi, "Metaverse in Business", <https://virsabi.com/> (Apr. 20, 2017), retrieved on Jun. 14, 2023.
Trimble <https://sitevision.trimble.com/> (Oct. 24, 2018), retrieved on Jun. 14, 2023.
Mantooth, TJ, "IP Issues for Retail Businesses Advertising in Augmented Reality", Jul. 26, 2022, <https://ipwatchdog.com/2022/07/26/ip-issues-retail-businesses-advertising-augmented-reality/id=150383/> (retrieved on Jul. 27, 2023).
Youtube. "Tesla Cybertruck doesn't fit in the average garage!", Dec. 6, 2019, https://youtu.be/PuZz6OFMW5A (retrieved on Jul. 31, 2023).
AR Cybertruck. LuvBug Media, Mar. 8, 2020. Google Play Store, <https://play.google.com/store/apps/details?id=com.luvbug.cybertruck&pli=1> (retrieved on on Jul. 31, 2023).
International Search Report and Written Opinion mailed Oct. 25, 2023 in PCT/CA2023/051032.
Mourtzis et al., "Real-Time Remote Maintenance Support Based on Augmented Reality (AR)", 2020. (Year: 2020).
Zhao et al., "Voice Interaction for Augmented Reality Navigation Interfaces with Natural Language Understanding", IEEE, 2020. (Year: 2020).

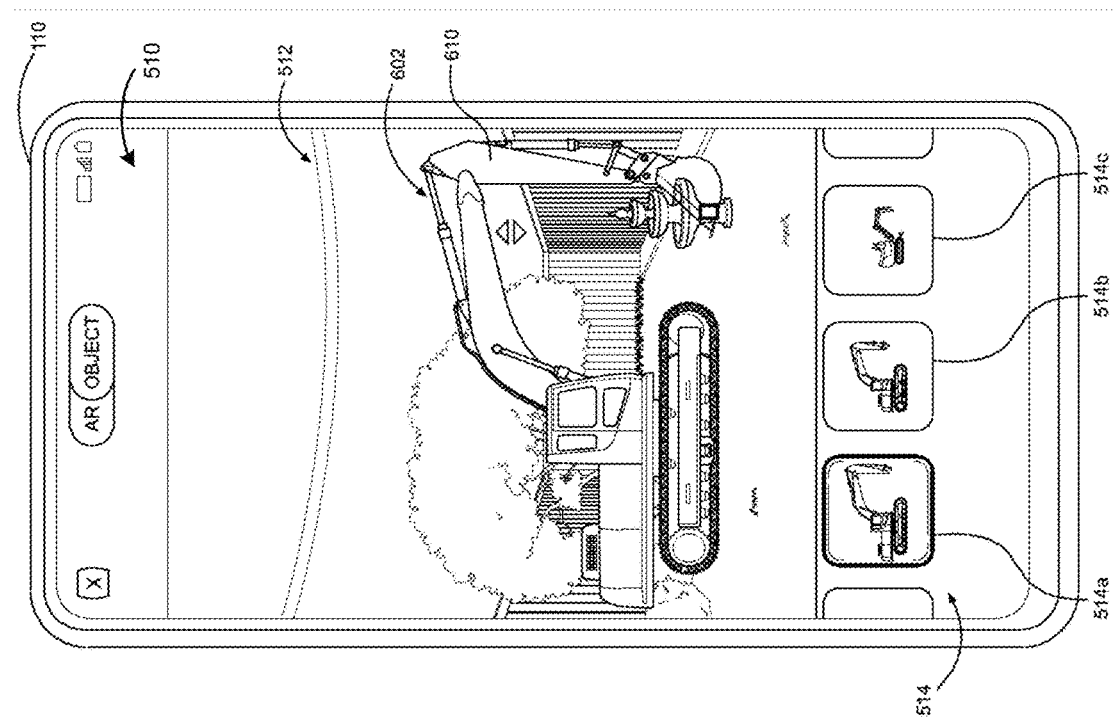

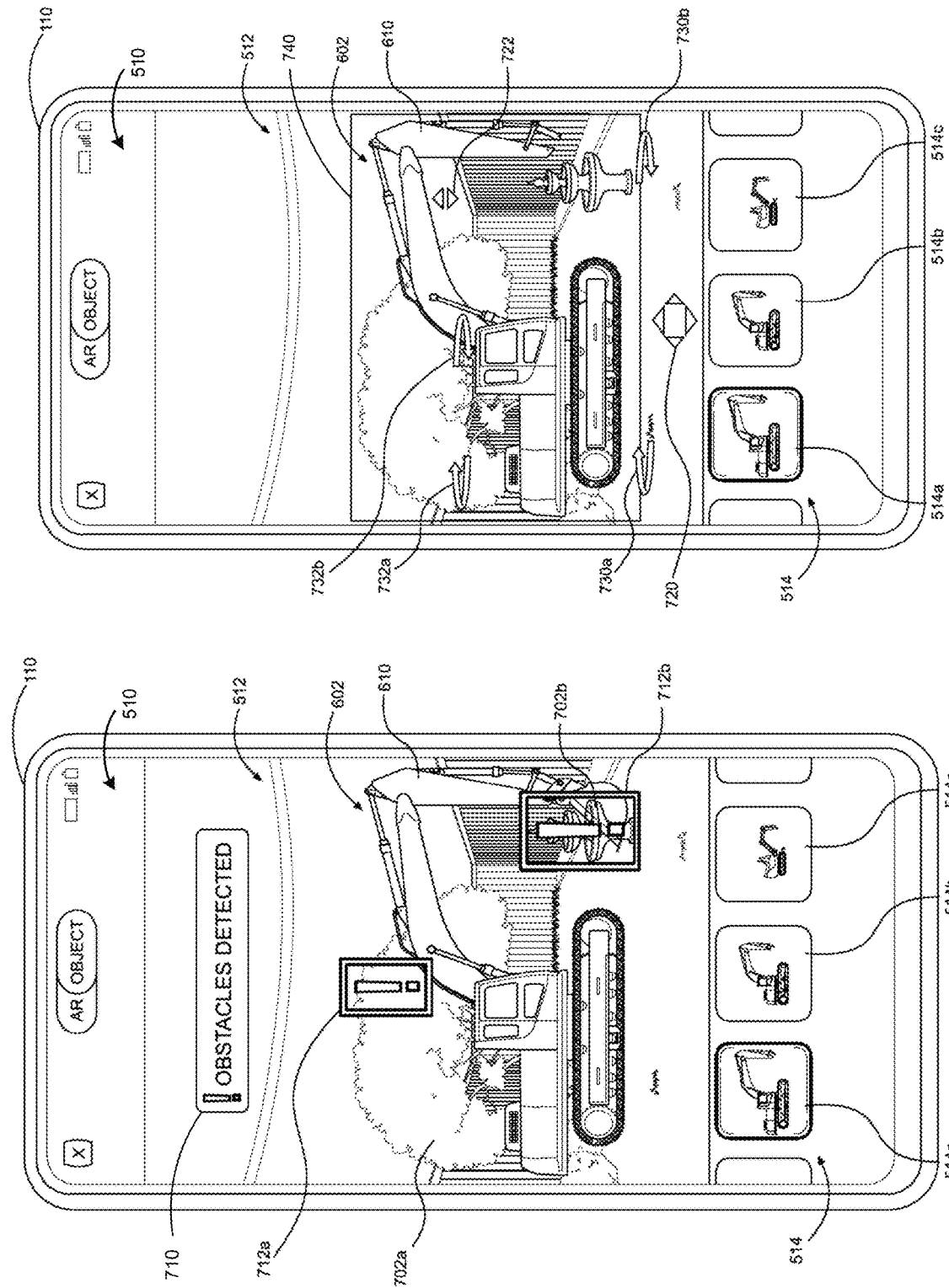

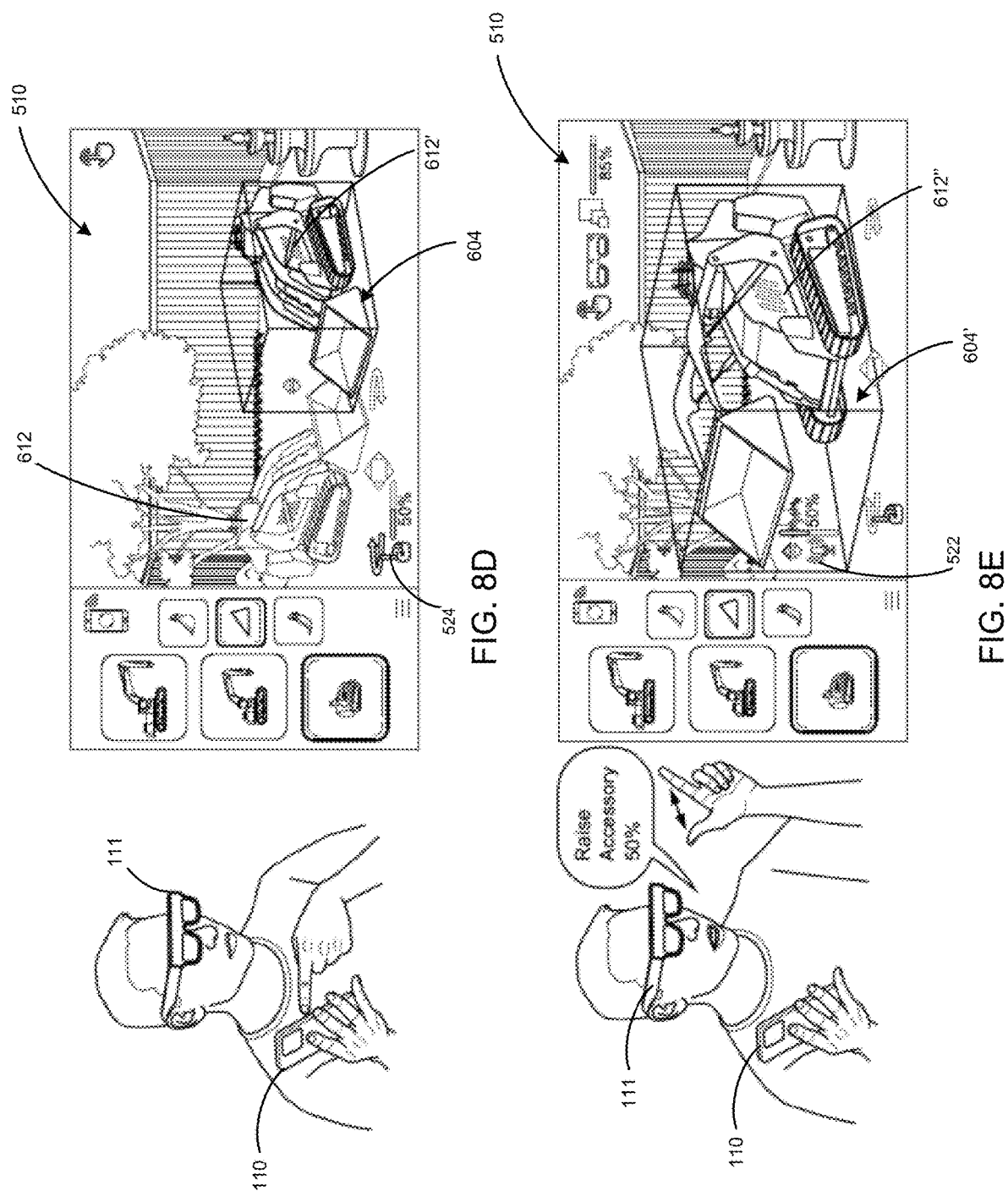

SYSTEMS AND METHODS FOR DYNAMIC INTERACTION WITH AN AUGMENTED REALITY ENVIRONMENT

CROSS REFERENCE TO RELATED APPLICATIONS

This application is a continuation of U.S. patent application Ser. No. 18/229,386 filed on Aug. 2, 2023, which is a continuation-in-part of U.S. patent application Ser. No. 18/316,498 filed on May 12, 2023, which is a continuation of U.S. patent application Ser. No. 17/984,338 filed on Nov. 10, 2022 and issued as U.S. Pat. No. 11,688,149, which claims benefit of U.S. Provisional Patent Application No. 63/394,716 filed on Aug. 3, 2022. Each of U.S. patent application Ser. No. 18/229,386, U.S. patent application Ser. No. 18/316,498, U.S. patent application Ser. No. 17/984,338 and U.S. Provisional Patent Application No. 63/394,716 is hereby incorporated by reference in its entirety.

FIELD

The described embodiments relate to systems and methods for dynamic interaction with an augmented reality environment. In some embodiments, the systems and methods are directed at dynamically interacting with machinery within the augmented reality environment.

BACKGROUND

As commerce transitions towards online platforms, there are aspects of the in-person experience that cannot be easily replaced. For example, physical access to the products and the people-to-people interaction are some aspects of the in-person commerce experience that are critical to some consumers. These aspects of the in-person commerce experience could also be important when conducting a transaction involving certain physical property that may require fuller inspection, such as expensive physical items (e.g., equipment, jewelry, land, property, etc.).

Construction equipment, for example, is expensive and so, selecting the wrong piece of equipment can result in significant financial loss and construction project delays. When a customer is looking to conduct a transaction (whether by rental, lease, purchase, or other means) involving construction equipment, the process can be difficult as each piece of equipment has unique features and may be in varying (or unknown) working conditions. Due to the nature of such construction equipment and the training required to operate it, it may not be possible to fully test the equipment even if physical access to the equipment were available. It can also be difficult to determine whether the equipment would fit within the intended site. This acquisition process is even more complicated when conducted online since the customer would have no physical access to the equipment.

SUMMARY

The various embodiments described herein generally relate to methods (and associated systems configured to implement the methods) for dynamic interaction with an augmented reality environment. In some embodiments, the systems and methods are directed at dynamically interacting with machinery within the augmented reality environment.

In accordance with an example embodiment, there is provided a method for dynamically interacting with machinery within an augmented reality environment via an augmented reality device. The method includes analyzing, with the augmented reality device, a site in which the machinery is to be operated to capture environment data related to the site; displaying on the augmented reality device an augmented reality representation of the machinery as an overlay of a portion of an augmented reality environment corresponding to the site; receiving an interaction request via the augmented reality device for interacting with the augmented reality representation of the machinery; determining, based on the captured environmental data, whether the interaction request can be completed in respect of the machinery within the site; and in response to determining that the interaction request can be completed, displaying, on the augmented reality device, the augmented reality representation of the machinery in accordance with the interaction request, otherwise, indicating on the augmented reality device that the interaction request cannot be completed within the site.

In some embodiments, analyzing the site comprises capturing the environmental data for estimating a site boundary of the site in which the machinery is to be operated.

In some embodiments, analyzing the site comprises detecting one or more obstacles for the machinery within the site.

In some embodiments, analyzing the site comprises continuing to analyze the site during interaction with the augmented reality environment.

In some embodiments, determining whether the interaction request can be completed for the machinery within the site comprises determining whether an operating range of the machinery for completing the interaction request is restricted by one or more of the site boundary and an obstacle within the site; and indicating on the augmented reality device that the interaction request cannot be completed within the site comprises indicating that the machinery is unsuitable for the site.

In some embodiments, indicating that the machinery is unsuitable for the site comprises indicating the operating range of the machinery is restricted by the one or more of the site boundary and the obstacle within the site.

In some embodiments, indicating that the machinery is unsuitable for the site comprises recommending an alternative machinery suitable for the site.

In some embodiments, recommending the alternative machinery suitable for the site comprises: determining a weight category of a suitable machinery for the site boundary based on the environment data; determining whether the machinery is available in the weight category; and in response to determining the machinery is available in the weight category, identifying the machinery associated with the weight category as the alternative machinery, otherwise, identifying the alternative machinery as the suitable machinery associated with the determined weight category and a similar functionality as the machinery.

In some embodiments, indicating on the augmented reality device that the interaction request cannot be completed within the site comprises requesting the site to be analyzed again with the augmented reality device.

In some embodiments, the interaction request comprises substituting a machinery attachment on the machinery.

In some embodiments, the interaction request comprises operating the augmented reality representation of the machinery within the augmented reality environment.

In some embodiments, the interaction request comprises operating the augmented reality representation of a machinery component of the machinery within the augmented reality environment.

In some embodiments, the augmented reality representation of the machinery comprises a three-dimensional model of the machinery.

In some embodiments, the three-dimensional model of the machinery comprises a three-dimensional model of each machinery component.

In accordance with an embodiment, there is provided a system for dynamically interacting with machinery within an augmented reality environment via an augmented reality device. The system includes a processor configured to: receive environment data captured by the augmented reality device related to a site in which the machinery is to be operated; display on the augmented reality device an augmented reality representation of the machinery as an overlay of a portion of an augmented reality environment corresponding to the site; receive an interaction request via the augmented reality device for interacting with the augmented reality representation of the machinery; determine, based on the captured environmental data, whether the interaction request can be completed in respect of the machinery within the site; and in response to determining that the interaction request can be completed, display, on the augmented reality device, the augmented reality representation of the machinery in accordance with the interaction request, otherwise, indicate on the augmented reality device that the interaction request cannot be completed within the site.

In some embodiments, the processor is further configured to: estimate a site boundary of the site in which the machinery is to be operated based on the environment data.

In some embodiments, the processor is further configured to: detect one or more obstacles for the machinery within the site.

In some embodiments, the processor is further configured to: continue to analyze the site during interaction with the augmented reality environment.

In some embodiments, the processor is further configured to: determine whether an operating range of the machinery for completing the interaction request is restricted by one or more of the site boundary and an obstacle within the site; and indicate that the machinery is unsuitable for the site when the operating range of the machinery required for completing the interaction request exceeds the site boundary.

In some embodiments, the processor is further configured to: indicate on the augmented reality device that the operating range of the machinery is restricted by the one or more of the site boundary and the obstacle within the site.

In some embodiments, the processor is further configured to: recommend on the augmented reality device an alternative machinery suitable for the site when the machinery is unsuitable for the site.

In some embodiments, the processor is further configured to: determine a weight category of a suitable machinery for the site boundary based on the environment data; determine whether the machinery is available in the weight category; and in response to determining the machinery is available in the weight category, identify the machinery associated with the weight category as the alternative machinery, otherwise, identify the alternative machinery as the suitable machinery associated with the determined weight category and a similar functionality as the machinery.

In some embodiments, the processor is further configured to: request the site to be analyzed again with the augmented reality device when the interaction request cannot be completed within the site.

In some embodiments, the interaction request comprises substituting a machinery attachment on the machinery.

In some embodiments, the interaction request comprises operating the augmented reality representation of the machinery within the augmented reality environment.

In some embodiments, the interaction request comprises operating the augmented reality representation of a machinery component of the machinery within the augmented reality environment.

In some embodiments, the augmented reality representation of the machinery comprises a three-dimensional model of the machinery.

In some embodiments, the three-dimensional model of the machinery comprises a three-dimensional model of each machinery component.

In accordance with an embodiment, there is provided a method for dynamically interacting with an augmented reality environment via an augmented reality device. The method includes analyzing, with the augmented reality device, a site in which an object is to be placed to capture environment data related to the site; displaying on the augmented reality device an augmented reality representation of the object as an overlay of a portion of an augmented reality environment corresponding to the site; receiving an interaction request via the augmented reality device for interacting with the augmented reality representation of the object; determining, based on the captured environmental data, whether the interaction request can be completed in respect of the object within the site; and in response to determining that the interaction request can be completed, displaying, on the augmented reality device, the augmented reality representation of the object in accordance with the interaction request, otherwise, indicating on the augmented reality device that the interaction request cannot be completed within the site.

In some embodiments, analyzing the site comprises capturing the environmental data for estimating a site boundary of the site in which the object is to be placed.

In some embodiments, analyzing the site comprises detecting one or more obstacles for the object within the site.

In some embodiments, analyzing the site comprises analyzing the site during interaction with the augmented reality environment.

In some embodiments, determining whether the interaction request can be completed for the object within the site comprises determining whether an operating range of the object for completing the interaction request is restricted by one or more of the site boundary and an obstacle within the site; and indicating on the augmented reality device that the interaction request cannot be completed within the site comprises indicating that the object is unsuitable for the site.

In some embodiments, indicating that the object is unsuitable for the site comprises indicating the operating range of the object is restricted by the one or more of the site boundary and the obstacle within the site.

In some embodiments, indicating that the object is unsuitable for the site comprises recommending an alternative object suitable for the site.

In some embodiments, indicating on the augmented reality device that the interaction request cannot be completed within the site comprises requesting the site to be analyzed again with the augmented reality device.

In some embodiments, the interaction request comprises operating the augmented reality representation of the object within the augmented reality environment.

In some embodiments, the augmented reality representation of the object comprises a three-dimensional model of the object.

In some embodiments, the object comprises a merchandisable item.

In accordance with an example embodiment, there is provided a system for dynamically interacting with an augmented reality environment via an augmented reality device. The system includes a processor configured to: receive environment data captured by the augmented reality device related to a site in which an object is to be placed; display on the augmented reality device an augmented reality representation of the object as an overlay of a portion of an augmented reality environment corresponding to the site; receive an interaction request via the augmented reality device for interacting with the augmented reality representation of the object; determine, based on the captured environmental data, whether the interaction request can be completed in respect of the object within the site; and in response to determining that the interaction request can be completed, display, on the augmented reality device, the augmented reality representation of the object in accordance with the interaction request, otherwise, indicate on the augmented reality device that the interaction request cannot be completed within the site.

In some embodiments, the processor is further configured to: estimate a site boundary of the site in which the object is to be placed.

In some embodiments, the processor is further configured to: detect one or more obstacles for the object within the site.

In some embodiments, the processor is further configured to: analyze the site during interaction with the augmented reality environment.

In some embodiments, the processor is further configured to: determine whether an operating range of the object for completing the interaction request is restricted by one or more of the site boundary and an obstacle within the site; and indicate that the object is unsuitable for the site.

In some embodiments, the processor is further configured to: indicate that the operating range of the object is restricted by the one or more of the site boundary and the obstacle within the site.

In some embodiments, the processor is further configured to: recommend an alternative object suitable for the site.

In some embodiments, the processor is further configured to: request the site to be analyzed again with the augmented reality device.

In some embodiments, the interaction request comprises operating the augmented reality representation of the object within the augmented reality environment.

In some embodiments, the augmented reality representation of the object comprises a three-dimensional model of the object.

In some embodiments, the object comprises a merchandisable item.

In accordance with an embodiment, there is provided a method for dynamically interacting with an augmented reality environment via an augmented reality device. The method includes analyzing, with the augmented reality device, a site in which an object is to be placed to capture environment data related to the site; displaying on the augmented reality device an augmented reality representation of the object as an overlay of a portion of an augmented reality environment corresponding to the site; receiving an interaction request via the augmented reality device for interacting with the augmented reality representation of the object; determining, based on the captured environmental data, whether the interaction request can be completed in respect of the object within the site, wherein the interaction request comprises an active engagement corresponding to one or more real-world usages of the object; and in response to determining that the interaction request can be completed, displaying, on the augmented reality device, the augmented reality representation of the object in accordance with the interaction request, otherwise, indicating on the augmented reality device that the interaction request cannot be completed within the site.

In some embodiments, indicating on the augmented reality device that the interaction request cannot be completed within the site comprises displaying on the augmented reality device at least one cause preventing completion of the interaction request.

In some embodiments, the method further comprises receiving an override input from the augmented reality device to initiate completion of the interaction request and to disregard the at least one cause preventing completion of the interaction request.

In some embodiments, indicating on the augmented reality device that the interaction request cannot be completed within the site comprises displaying one or more alternative objects suitable for the site.

In some embodiments, the method further comprises determining the one or more alternative objects based on one or more of a user preference and a historical user data.

In some embodiments, the method further comprises receiving an override input from the augmented reality device to initiate completion of the interaction request in response to the indication that the interaction request cannot be completed within the site.

In some embodiments, the method further comprises receiving a transaction request for the object via the augmented reality device.

In some embodiments, the method further comprises receiving, at the augmented reality device via a network, a user input from a remote device in respect of the interaction request.

In some embodiments, the interaction request comprises an engagement with one or more components of the object.

In some embodiments, indicating that the object is unsuitable for the site comprises indicating the one or more components of the object is unsuitable for the site; and recommending an alternative component compatible for the object and suitable for the site.

In some embodiments, the object comprises machinery.

In some embodiments, the interaction request comprises operating a component of the augmented reality representation of the machinery, the component corresponding to a machinery attachment on the machinery and the operation of the component of the augmented reality representation corresponding to a real-life operation of the machinery attachment within the site.

In some embodiments, the method further comprises receiving a transaction request for the machinery attachment via the augmented reality device.

In some embodiments, indicating that the object is unsuitable for the site comprises indicating the component of the machinery is unsuitable for the site; and recommending an alternative component compatible for the machinery and suitable for the site.

In accordance with an embodiment, there is provided a system for dynamically interacting with an augmented reality environment via an augmented reality device. The system includes a processor operable to: receive environment data captured by the augmented reality device related to a site in which an object is to be placed; display on the augmented reality device an augmented reality representation of the object as an overlay of a portion of an augmented reality environment corresponding to the site; receive an interaction request via the augmented reality device for interacting with the augmented reality representation of the object, wherein the interaction request comprises an active engagement corresponding to one or more real-world usages of the object; determine, based on the captured environmental data, whether the interaction request can be completed in respect of the object within the site; and in response to determining that the interaction request can be completed, display, on the augmented reality device, the augmented reality representation of the object in accordance with the interaction request, otherwise, indicate on the augmented reality device that the interaction request cannot be completed within the site.

In accordance with an embodiment, there is provided a method for dynamically interacting with an augmented reality environment via an augmented reality device. The method includes analyzing, with the augmented reality device, a site in which an object is to be placed to capture environment data related to the site; displaying on the augmented reality device an augmented reality representation of the object as an overlay of a portion of an augmented reality environment corresponding to the site; receiving an interaction request via the augmented reality device for interacting with the augmented reality representation of the object; determining, based on the captured environmental data, whether the interaction request can be completed in respect of the object within the site; and in response to determining that the interaction request can be completed: displaying, on the augmented reality device, the augmented reality representation of the object in accordance with the interaction request; determining an available space within the augmented reality environment for displaying one or more advertisements; selecting, based at least on the available space and the object, the one or more advertisements to display on the augmented reality device; and displaying, on the augmented reality device, the one or more advertisements; otherwise, indicating on the augmented reality device that the interaction request cannot be completed within the site.

In some embodiments, the interaction request comprises substituting one or more components of the object.

In some embodiments, the one or more advertisements are dynamically adjustable within the available space.

In some embodiments, determining the available space within the augmented reality environment for displaying the one or more advertisements comprises: determining an operational area required for completing the interaction request; and identifying the available space for displaying the one or more advertisements based on the determined operational area.

In some embodiments, the method further comprises determining whether to adapt the one or more advertisements in response to a subsequent interaction request.

In some embodiments, the subsequent interaction request results in a reduced available space for the one or more advertisements and in response to determining the reduced available space, overlaying at least a portion of the one or more advertisements on the object.

In some embodiments, adapting the one or more advertisements in response to the subsequent interaction request comprises replacing at least one advertisement of the one or more advertisements with an alternative advertisement.

In some embodiments, adapting the one or more advertisements in response to the subsequent interaction request comprises replacing the one or more advertisements with an embedded advertisement selectable to display the one or more advertisements.

In some embodiments, at least one of the one or more advertisements comprises a limited time offer.

In some embodiments, displaying the one or more advertisements comprises displaying an embedded advertisement selectable to display the one or more advertisements.

In some embodiments, indicating on the augmented reality device that the interaction request cannot be completed within the site comprises offering a recommendation for the interaction request.

In accordance with an embodiment, there is provided a system for dynamically interacting with an augmented reality environment via an augmented reality device. The system includes a processor operable to: receive environment data captured by the augmented reality device related to a site in which an object is to be placed; display on the augmented reality device an augmented reality representation of the object as an overlay of a portion of an augmented reality environment corresponding to the site; receive an interaction request via the augmented reality device for interacting with the augmented reality representation of the object; determine, based on the captured environmental data, whether the interaction request can be completed in respect of the object within the site; and in response to determining that the interaction request can be completed: display, on the augmented reality device, the augmented reality representation of the object in accordance with the interaction request; determine an available space within the augmented reality environment for displaying one or more advertisements; select, based at least on the available space and the object, the one or more advertisements to display on the augmented reality device; and display, on the augmented reality device, the one or more advertisements; otherwise, indicate on the augmented reality device that the interaction request cannot be completed within the site.

In accordance with an embodiment, there is provided a method for dynamically interacting with an augmented reality environment via an augmented reality device. The method includes analyzing, with the augmented reality device, a site in which an object is to be placed to capture environment data related to the site; displaying on the augmented reality device an augmented reality representation of the object as an overlay of a portion of an augmented reality environment corresponding to the site; receiving a connection request via a network from a remote device to access the augmented reality device; authenticating the connection request to determine whether to grant the remote device access to the augmented reality device; in response to authenticating the connection request, mirroring a display of the remote device with a display of the augmented reality device and receiving an interaction request from a remote user via the remote device for interacting with the augmented reality representation of the object; determining, based on the captured environmental data, whether the interaction request can be completed in respect of the object within the site; and in response to determining that the interaction request can be completed, displaying, on the augmented reality device, the augmented reality representation of the object in accordance with the interaction request, otherwise, indicating on the augmented reality device that the interaction request cannot be completed within the site.

In some embodiments, the connection request comprises a request to access one or more augmented reality devices, and in response to authenticating the connection request to at least two augmented reality devices of the one or more augmented reality devices, synchronizing the interaction request received from the remote device between the at least two augmented reality devices.

In some embodiments, the interaction request comprises a support input for facilitating an interaction request received at the augmented reality device.

In some embodiments, the method further comprises receiving a remote connection request from the augmented reality device to request engagement with the remote device prior to receiving the connection request from the remote device.

In accordance with an embodiment, there is provided a system for dynamically interacting with an augmented reality environment via an augmented reality device. The system includes a processor operable to: receive environment data captured by the augmented reality device related to a site in which an object is to be placed; display on the augmented reality device an augmented reality representation of the object as an overlay of a portion of an augmented reality environment corresponding to the site; receive a connection request via a network from a remote device to access the augmented reality device; authenticate the connection request to determine whether to grant the remote device access to the augmented reality device; in response to authenticating the connection request, mirror a display of the remote device with a display of the augmented reality device and receive an interaction request from a remote user via the remote device for interacting with the augmented reality representation of the object; determine, based on the captured environmental data, whether the interaction request can be completed in respect of the object within the site; and in response to determining that the interaction request can be completed, display, on the augmented reality device, the augmented reality representation of the object in accordance with the interaction request, otherwise, indicate on the augmented reality device that the interaction request cannot be completed within the site.

In accordance with an embodiment, there is provided a method for dynamically interacting with an augmented reality environment via an augmented reality device. The method includes analyzing, with the augmented reality device, a site in which an object is to be placed to capture environment data related to the site; displaying on the augmented reality device an augmented reality representation of the object as an overlay of a portion of an augmented reality environment corresponding to the site; receiving an interaction request via the augmented reality device for interacting with the augmented reality representation of the object, the interaction request being received via the augmented reality device as a voice command input; determining, based on the captured environmental data, whether the interaction request can be completed in respect of the object within the site, wherein the interaction request comprises an active engagement corresponding to one or more real-world usages of the object; and in response to determining that the interaction request can be completed, displaying, on the augmented reality device, the augmented reality representation of the object in accordance with the interaction request, otherwise, indicating on the augmented reality device that the interaction request cannot be completed within the site.

In some embodiments, the method further comprises applying a natural language processing model to interpret the voice command input.

In some embodiments, the method further comprises receiving an input as a voice command input via the augmented reality device to initiate completion of the interaction request in response to the indication that the interaction request cannot be completed within the site.

In some embodiments, the interaction request comprises operating a component of the augmented reality representation of the object, the operation of the component of the augmented reality representation corresponding to a real-life operation of the component within the site.

In some embodiments, the method further comprises displaying an augmented reality representations of a second object as an overlay of the portion of the augmented reality environment, and wherein the interaction request comprises one or more of mirroring an operation between the augmented reality representation of the object and the augmented reality representations of the second object, synchronizing the operation between the augmented reality representation of the object and the augmented reality representations of the second object, and compartmentalizing the operation between the augmented reality representation of the object and the augmented reality representations of the second object.

In accordance with an example embodiment, there is provided a system for dynamically interacting with an augmented reality environment via an augmented reality device. The system includes a processor operable to: receive environment data captured by the augmented reality device related to a site in which an object is to be placed; display on the augmented reality device an augmented reality representation of the object as an overlay of a portion of an augmented reality environment corresponding to the site; receive an interaction request via the augmented reality device for interacting with the augmented reality representation of the object, the interaction request being received via the augmented reality device as a voice command input; determine, based on the captured environmental data, whether the interaction request can be completed in respect of the object within the site, wherein the interaction request comprises an active engagement corresponding to one or more real-world usages of the object; and in response to determining that the interaction request can be completed, display, on the augmented reality device, the augmented reality representation of the object in accordance with the interaction request, otherwise, indicate on the augmented reality device that the interaction request cannot be completed within the site.

BRIEF DESCRIPTION OF THE DRAWINGS

Several embodiments will now be described in detail with reference to the drawings, in which:

FIG. 6A shows the augmented reality environment of FIG. 5 overlaid with an example representation of machinery in accordance with an example embodiment;

FIG. 7A shows an example augmented reality interface with example alerts generated by the dynamic interaction system in accordance with an example embodiment;

FIG. 7B shows another example augmented reality interface from which an interaction request can be received for operating the example machinery in accordance with an example embodiment;

FIG. 8D shows another example augmented reality interface from which an interaction request can be received in accordance with an example embodiment;

FIG. 8E shows the example augmented reality interface of FIG. 8D following completion of the interaction request in accordance with an example embodiment;

Figure 1:
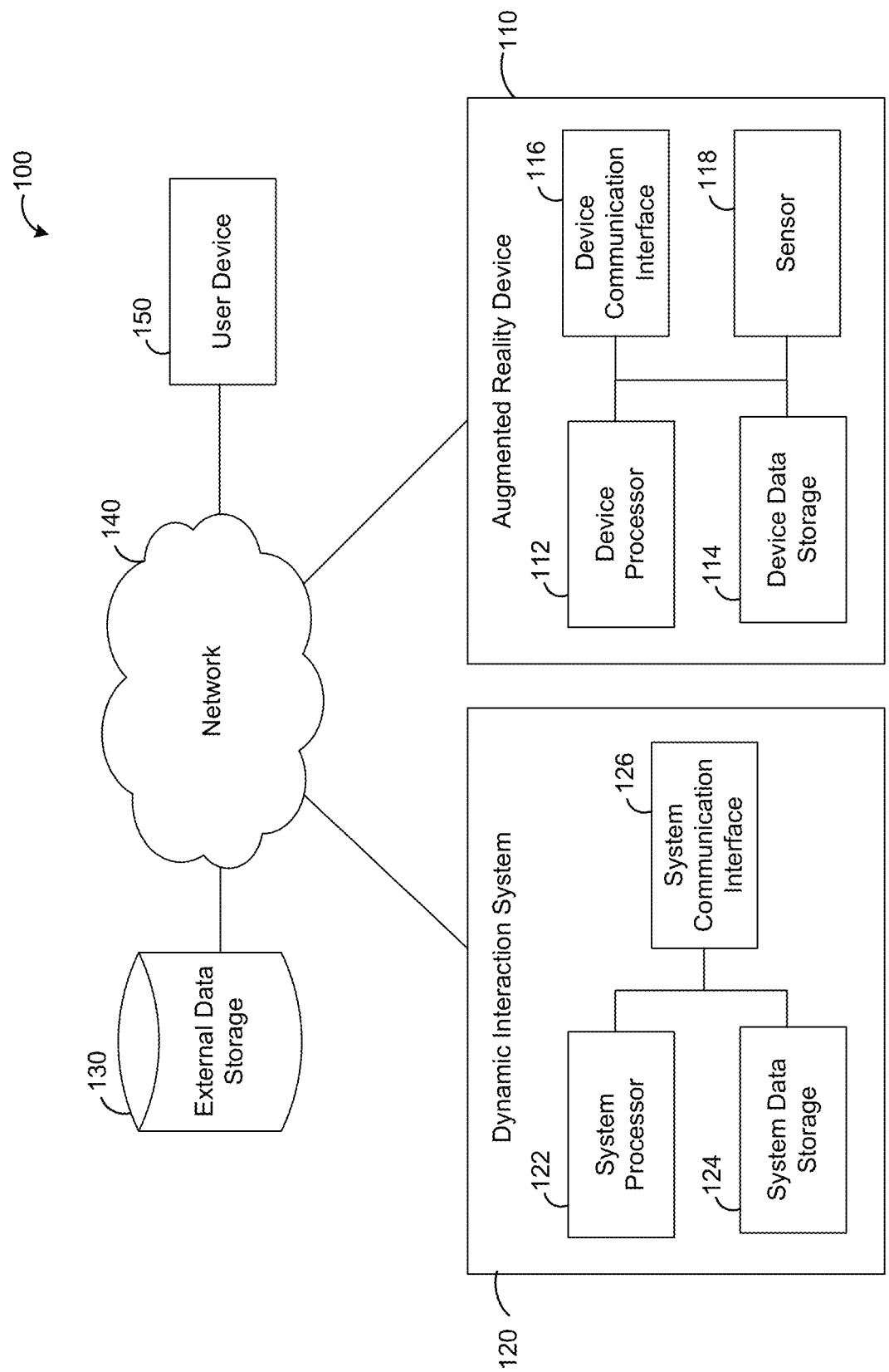
FIG. 1 is a block diagram of components interacting with an example dynamic interaction system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) for dynamic interaction with an augmented reality environment. In some embodiments, the systems and methods are directed at dynamically interacting with machinery within the augmented reality environment. The interaction with the machinery can include, but is not limited to, components of the machinery, such as, machine arms and attachments. In some embodiments, the systems and methods are directed at dynamically interacting with merchandisable items including, but without limitation, construction equipment, vehicular equipment, agricultural equipment, and manufacturing equipment, and/or any compatible accessories, within the augmented reality environment. For example, but not of limitation, the systems and methods described herein can apply to automotive vehicles, aeronautical vessels, nautical vessels, and/or consumer electronics.

Augmented reality enables an interactive experience for a user via an augmented reality device. The augmented reality experience involves a real-world environment that is "enhanced" with overlaid computer-generated information on the augmented reality device. The overlaid information can be added to the real-world environment as generated on the augmented reality device or can be used to mask a portion of the real-world environment on the augmented reality device. Other sensory information (e.g., auditory, motion, haptic, somatosensory, olfactory, etc.) can be added to the augmented reality experience.

Augmented reality technology is often confused with virtual reality solutions. In contrast to augmented reality, virtual reality replaces the user's real-world environment with a simulated environment. Virtual reality technology is typically delivered through virtual reality headsets, which presents simulated visual and audio information to the user such that the user becomes fully immersed in the virtual world.

With commerce transitioning towards online platforms, there are aspects of the in-person experience that cannot be easily replaced. In general, many consumers enjoy being able to physically access the physical item or property that would be involved in a transaction (whether by rental, lease, purchase or other means). In addition to the in-person experience, there are physical items or property that justify a fuller inspection prior to completing a transaction. For example, expensive physical items (e.g., equipment, jewelry, consumer electronics, etc.), and land or property normally warrants a deeper inspection prior to such a financial investment. Solutions driven by augmented reality technology can improve this transition.

One advantage of online commerce platforms is that consumers can conduct a transaction involving merchandisable items wherever they may be located and can also conduct a transaction involving items from nearly anywhere in the world. The systems and methods disclosed herein enable a user to dynamically interact with an augmented reality environment representing an intended site for the merchandisable item. With the systems and methods disclosed herein, users can obtain environment data of the intended site to determine a boundary of the site and/or any relevant obstacles. Example methods of obtaining the environment data can include, but are not limited to, operating an augmented reality device to capture a photographic, a LiDAR (Light Detection and Ranging) scan, and/or a RADAR (Radio Detection and Ranging) scan.

The systems and methods disclosed herein can generate augmented reality visualizations of the site with the merchandisable item(s) being considered in a transaction represented as an overlay to the augmented reality visualizations of the site. The systems and methods disclosed herein can also enable the user to dynamically interact with the representations of the merchandisable items within the augmented reality visualizations of the site, including the real-world objects within the site. This can then enable the consumer to visually appreciate the placement and/or usage of the merchandisable item within the intended site. In some embodiments, the systems disclosed herein can also determine whether the item would physically and functionally fit within the intended site. For example, the system can determine whether the item could be operated in accordance with its core product functionality during operation or general use within the site boundary.

Machinery is one such example merchandisable item. Transactions involving machinery can be complicated as there are many considerations, such as where the machinery will be used, its intended use, the attachments that may be needed, how the machinery will be transported to the site, aspects of the installation process, etc. A transaction involving machinery can also be difficult as each piece of equipment has unique features and may be in varying (or unknown) working conditions. This process is even more complicated when conducted online since the customer would have no physical access to the equipment. Selecting unsuitable machinery (or incompatible components, such as parts, accessories and/or attachments) and having that machinery, or any related items, delivered to the site to then discover either or both were unsuitable and/or incompatible would result in significant financial losses (due to the financial investment in the transaction as well as the likely project delays that would result).

One challenge with transactions involving machinery is the difficulty in accurately determining whether the machinery would fit within the intended site and whether that machinery would work within the intended site to its fullest capacity. Manual measurements of an intended site to identify a machinery are prone to human errors and/or missed obstacles as the user making the measurements are unlikely trained to operate the machinery or technically knowledgeable about the machinery, and/or its compatible components, such as but not limited to parts, accessories and/or attachments. There are many factors to consider when fitting machinery to the site and the customer making the measurement may not be familiar with potential obstacles that will limit the functionality of the machinery. For example, a customer looking to conduct a transaction involving an excavator from an online provider may not be familiar with the range of motion of the excavator arm, which attachments are compatible based on the model selected, or may not be able to visualize how much volume the machinery would occupy within the site. Also, customers who may be familiar with a certain make of the machinery may not be familiar with that machinery by another manufacturer or the machinery with different dimensions and/or functionalities. Being able to visualize and interact with the machinery within the intended site before engaging in a transaction involving the machinery and transportation of the machinery would mitigate against possible losses.

The systems and methods disclosed herein enable a user to dynamically interact with machinery within an augmented reality environment representing the intended site (including the real-world objects within that site). The described systems and methods also enable the user to operate the machinery within the augmented reality environment in a way that mirrors a real-life operation of the machinery within the intended site. For example, based on interaction requests received via the augmented reality device, the disclosed systems can display the machinery based on that interaction request. When receiving the interaction requests and/or when the representation of the machinery is first included as the overlay to the augmented reality environment, the disclosed systems can determine whether the machinery would fit and be operated accordingly within the intended site.

The systems and methods also enable the user to alternate between the various attachments to dynamically interact with the machinery within the site, including independent interaction with each machinery component (such as but not limited to component parts, machinery arms, accessories, attachments, etc.). Users can then explore and visualize the operation of the machinery (e.g., excavator arm extended or raised, etc.) with different compatible attachments (such as, but not limited to, quick couplers, buckets, tilt rotators, hydraulic thumbs, etc.) for various use cases within the site. For example, the disclosed systems can receive an interaction request to add a clamping attachment to a base machinery. The disclosed systems can also receive an interaction request from the user to operate the clamping attachment via the augmented reality device, such as to "clamp" with the clamping attachment. The interaction request to add and operate the clamping attachment can be received as one or separate interaction requests. In another example, the disclosed systems can receive an interaction request to replace the clamping attachment with a bucket attachment. The interaction request in respect of the bucket attachment can include operating the bucket attachment up and down. Users can benefit from a more realistic experience on how the machinery and the various attachments may operate together.

Machinery is generally difficult and expensive to transport and install (particularly when dealing with specialized sizes, shapes and weight). Further, being able to dynamically interact with the machinery as it is transported, as an example, on a flatbed, will allow the receiver or provider to better plan transportation according to the size and operation of the machinery and/or the attachment relative to the transportation method.

Reference is first made to FIG. 1, which shows a block diagram 100 of an example dynamic interaction system 120 in communication with an augmented reality device 110, a user device 150 and an external data storage 130 via a network 140.

The dynamic interaction system 120 includes a system processor 122, a system data storage 124 and a system communication interface 126. The dynamic interaction system 120 can be implemented with more than one computer servers distributed over a wide geographic area and connected via the network 140. The system processor 122, the system data storage 124 and the system communication interface 126 may be combined into fewer components or may be separated into further components. The system processor 122, the system data storage 124 and the system communication interface 126 may be implemented in software or hardware, or a combination of software and hardware.

The system processor 122 can be implemented with any suitable processor, controller, digital signal processor, graphics processing unit, application specific integrated circuits (ASICs), and/or field programmable gate arrays (FPGAs) that can provide sufficient processing power for the configuration, purposes, and requirements of the dynamic interaction system 120 as will be discussed herein. The system processor 122 can include more than one processor and each processor can be configured to perform different dedicated tasks.

The system communication interface 126 can include any interface that enables the dynamic interaction system 120 to communicate with various computing devices and other systems. In some embodiments, the system communication interface 126 can include at least one of a serial port, a parallel port or a USB port. For example, the system communication interface 126 can receive data from or transmit data to the user device 150, the augmented reality device 110, and/or the external data storage 130. The system communication interface 126 may include one or more of an Internet, Local Area Network (LAN), Ethernet, Firewire, modem or digital subscriber line connection.

The system data storage 124 can include RAM, ROM, one or more hard drives, one or more flash drives, or some other suitable data storage elements such as disk drives, etc. The system data storage 124 can, for example, include a memory used to store programs and an operating system used by the dynamic interaction system 120. The system data storage 124 can include one or more databases for storing information related to, but not limited to, users of the dynamic interaction system 120 (e.g., purchasers, sellers, rental houses, dealers, manufacturers, etc.), and merchandised items available for transaction (e.g., equipment, attachments, pricing, delivery, availability, models representing the merchandised items, etc.). The information can be stored on one database or separated into multiple databases.

The external data storage 130 can store data similar to that of the system data storage 124, and/or different data. The external data storage 130 can be used as a back-up data storage and/or for storing larger files which can be retrieved or accessed directly via the network 140. The external data storage 130 can, for example, be a network attached storage (NAS) or a cloud storage. The data stored in the external data storage 130 can be accessed by the dynamic interaction system 120, the augmented reality device 110 and/or the user device 150 via the network 140.

The user device 150 can include any networked device operable to connect to the network 140. A networked device is a device capable of communicating with other devices through a network such as the network 140. A networked device may couple to the network 140 through a wired or wireless connection.

The user device 150 can receive an input from a user and communicate with the dynamic interaction system 120, the external data storage 130, and/or the augmented reality device 110 via the network 140. The user device 150 can include at least a processor, a communication interface, and a data storage, and may be an electronic tablet device, a personal computer, workstation, portable computer, mobile device, personal digital assistant, laptop, smart phone, an interactive television, video display terminals, gaming consoles, and portable electronic devices or any combination of these. Although only one user device 150 is illustrated in FIG. 1, two or more user devices 150 can be in communication with the other components illustrated in FIG. 1.

The user device 150 may not be required for the operation of the methods and systems described herein. In some embodiments, the functionality of the user device 150 can be provided by the augmented reality device 110 such that no separate user device 150 is required.

The augmented reality device 110 can include any computing device that is capable of capturing environment data for generating an augmented reality environment based on the environment data. The augmented reality device 110 can include an electronic tablet device, a personal computer, a portable computer, mobile device, personal digital assistant, laptop, smart phone, an interactive television, video display terminals, gaming consoles, and portable electronic devices or any combination of these. Although only one augmented reality device 110 is illustrated in FIG. 1, two or more augmented reality device 110 can be in communication with the other components illustrated in FIG. 1.

The augmented reality device 110 can include at least a device processor 112, a device data storage 114, a device communication interface 116 and a sensor 118 including, without limitation, a motion sensor, proximity sensor, thermal sensor, image sensor, gyroscopes, accelerometers and magnetometers. It should be noted that the device processor 112, the device data storage 114, the device communication interface 116, and the sensor 118 may be combined or may be separated into further components. The device processor 112, the device data storage 114, the device communication interface 116, and the sensor 118 may be implemented in software or hardware, or a combination of software and hardware.

The device processor 112 controls the operation of the augmented reality device 110. The device processor 112 may be any suitable processors, controllers or digital signal processors that can provide sufficient processing power depending on the configuration, purposes and requirements of the augmented reality device 110 as will be described herein. In some embodiments, the device processor 112 can include more than one processor with each processor being configured to perform different dedicated tasks.

In some embodiments, the augmented reality device 110 can operate as the dynamic interaction system 120. For example, the dynamic interaction system 120 may be stored as a dynamic interaction application on the augmented reality device 110 enabling the methods and systems disclosed herein to operate on the augmented reality device 110. The dynamic interaction application may require access to the dynamic interaction system 120 and/or the external data storage 130 from time to time, or work entirely offline as a standalone application. When operating as a dynamic interaction application, the functionality of the dynamic interaction application may be reduced as compared to a cloud-based operation with the dynamic interaction system 120 via the network 140. For example, when operating as a standalone application, the dynamic interaction application may not be able to access all representations of the merchandised items. It may be that further downloads of data sets may be required to increase the functionality of the dynamic interaction application when operating as a standalone application.

The device data storage 114 can include RAM, ROM, one or more hard drives, one or more flash drives, or some other suitable data storage elements such as disk drives, etc. The device data storage 114 can, in some embodiments, store the dynamic interaction system 120 as a dynamic interaction application. In some embodiments, the device data storage 114 can store the environmental data being captured in respect of the intended site for the object, or any other data related to dynamic interaction with the object within the augmented reality environment.

The augmented reality device 110 includes a sensor 118. The sensor 118 can include one or more different types of sensors, in some embodiments. For example, the sensor 118 can include a camera to capture environment data for generating an augmented reality environment based on the environment data via photographic, LiDAR scans, and/or RADAR scans. The sensor 118 can include, but is not limited to, an optical sensor, an accelerometer, a global position system (GPS) (e.g., for assisting with verification of data input measurements to improve accuracy, etc.), a gyroscope (e.g., for measuring and/or maintaining orientation and angular velocity in calculating site environment while scanning, etc.), a solid state compass (e.g., two or three magnetic field sensors can provide data for the device processor 112 to provide orientation data for cross-verification of the GPS and gyroscopic data to align with the device scans, etc.), etc.

Figure 5B:
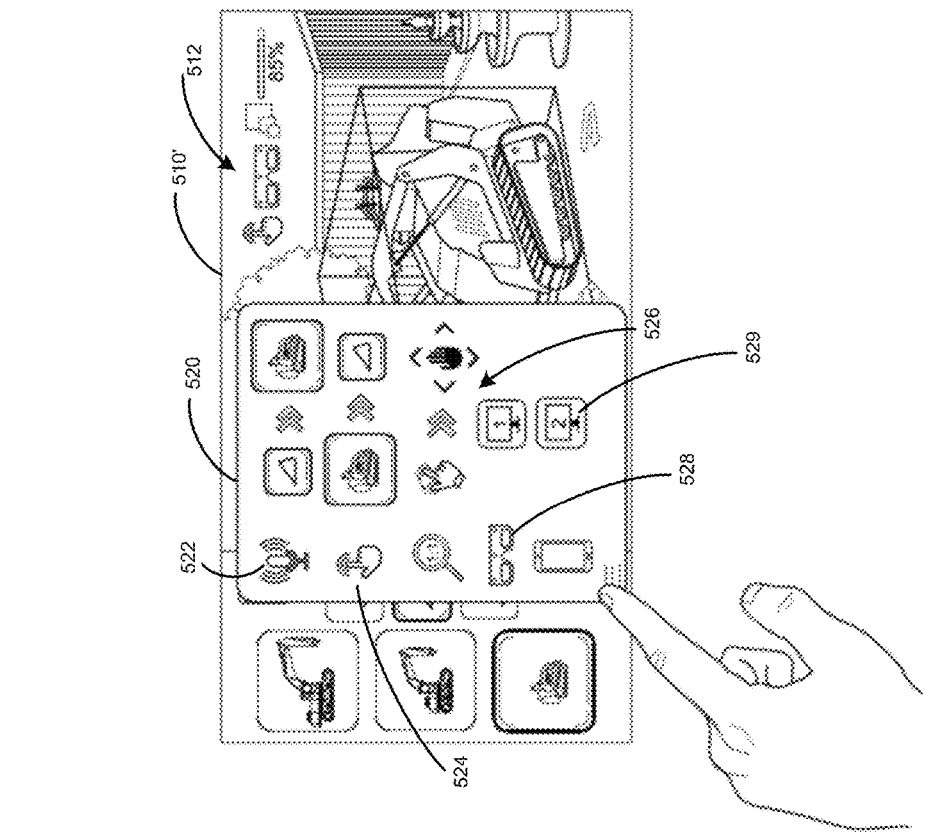
FIG. 5B shows an example augmented reality interface for the example augmented reality device shown in FIG. 5A in accordance with an example embodiment.

The device communication interface 116 may be any interface that enables the augmented reality device 110 to communicate with other computing devices and systems (see e.g., FIGS. 5B, 8D, and 8E). In some embodiments, the device communication interface 116 can include at least one of a serial port, a parallel port or a USB port. The device communication interface 116 may also include at least one of an Internet, Local Area Network (LAN), Ethernet, wireless, Firewire, modem or digital subscriber line connection. The device communication interface 116 can also include input devices, such as a mouse, a keyboard, a touch screen, a thumbwheel, a track-pad, a track-ball, eye-tracking, voice recognition software and the like, depending on the requirements and implementation of the augmented reality device 110. For example, the device communication interface 116 can include a display on which information, such as the augmented reality environment generated based on the environment data, can be shown to the user. The device communication interface 116 can also receive interaction requests for interacting with the augmented reality environment.

Figure 2:
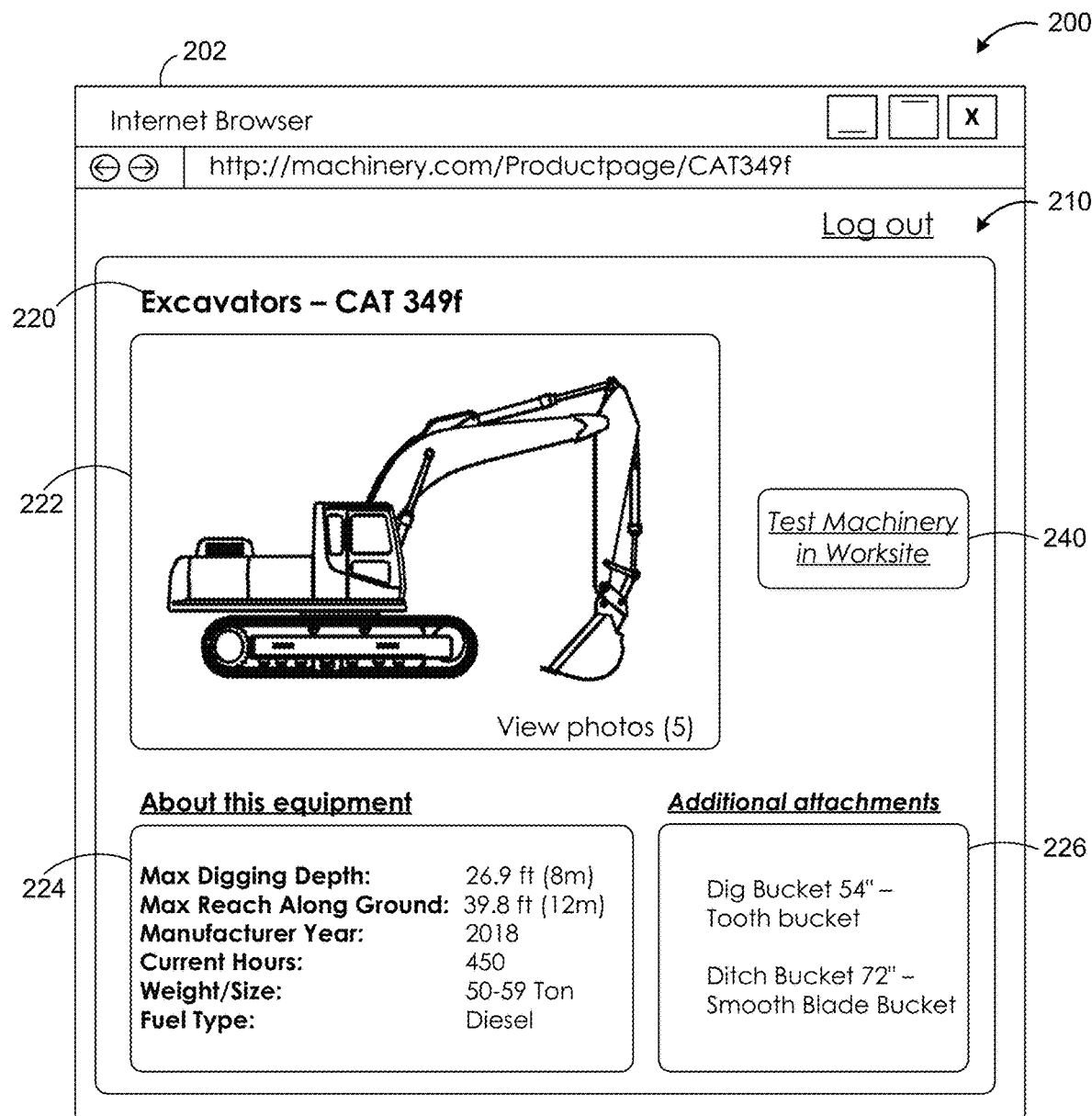
FIG. 2 is a screenshot of an example user interface from which the dynamic interaction system can be initiated.

In some embodiments, the dynamic interaction system 120 can be initiated from a connection request received via the network 140 and initiated via an internet browser application on the user device 150. FIG. 2 is a screenshot 200 of an example user interface 210 on an internet browser application 202 from which the dynamic interaction system 120 can be initiated. The user interface 210 includes various information in respect of the example merchandised item being considered, which in this example is machinery 220. The user interface 210 includes photographs 222 of the machinery, machinery information 224, and available attachments 226. Also, the user interface 210 includes a button 240 with an embedded universal resource locator (URL), which, when selected, can initiate the operation of the dynamic interaction system 120. It will be understood that button 240 is only an example interface element, and that other interface elements can be provided to enable the user to initiate the operation of the dynamic interaction system 120.

Figure 3:
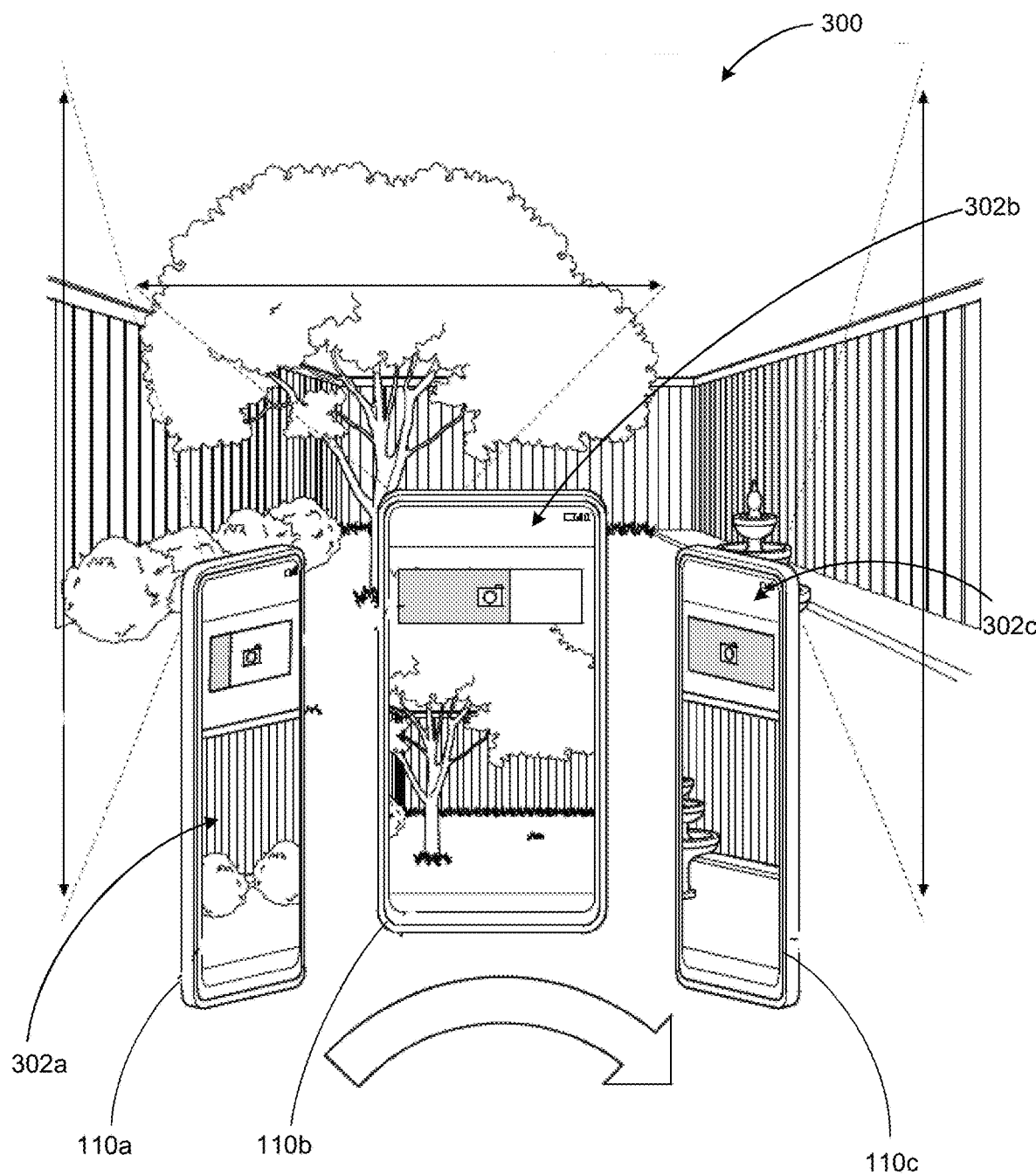
FIG. 3 shows an example site and an augmented reality device being operated for capturing environment data of the site in accordance with an example embodiment.

When the button 240 is selected on the user device 150 that lacks the sensor 118 required for capturing the environment data for generating the augmented reality representation, the internet browser application 202 can direct the user to the dynamic interaction system 120 in different manners. In some embodiments, the internet browser application 202 can generate an embedded code, such as an augmented reality QR code, which, when captured with the augmented reality device 110, would initiate operation of the dynamic interaction system 120 via the network 140 or the dynamic interaction application stored on the augmented reality device 110. FIG. 3 shows an example site 300 for machinery 220 with the augmented reality device 110 being moved from left to right (110*a* to 110*b* to 110*c*) to capture the environment data as shown in the device display generally at 302*a*, 302*b* and 302*c*, respectively. The device display 302 shown in FIG. 3 can be triggered when the dynamic interaction system 120 or dynamic interaction application is initiated via the button 240 on the internet browser application 202.

In some embodiments, the internet browser application 202 can be opened directly on the augmented reality device 110 and when the button 240 is selected, the dynamic interaction system 120 or dynamic interaction application is triggered directly to show the device display 302 on the augmented reality device 110 for capturing the environment data.

The network 140 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the dynamic interaction system 120, the augmented reality device 110, the user device 150, and the external data storage 130.

Figure 4:
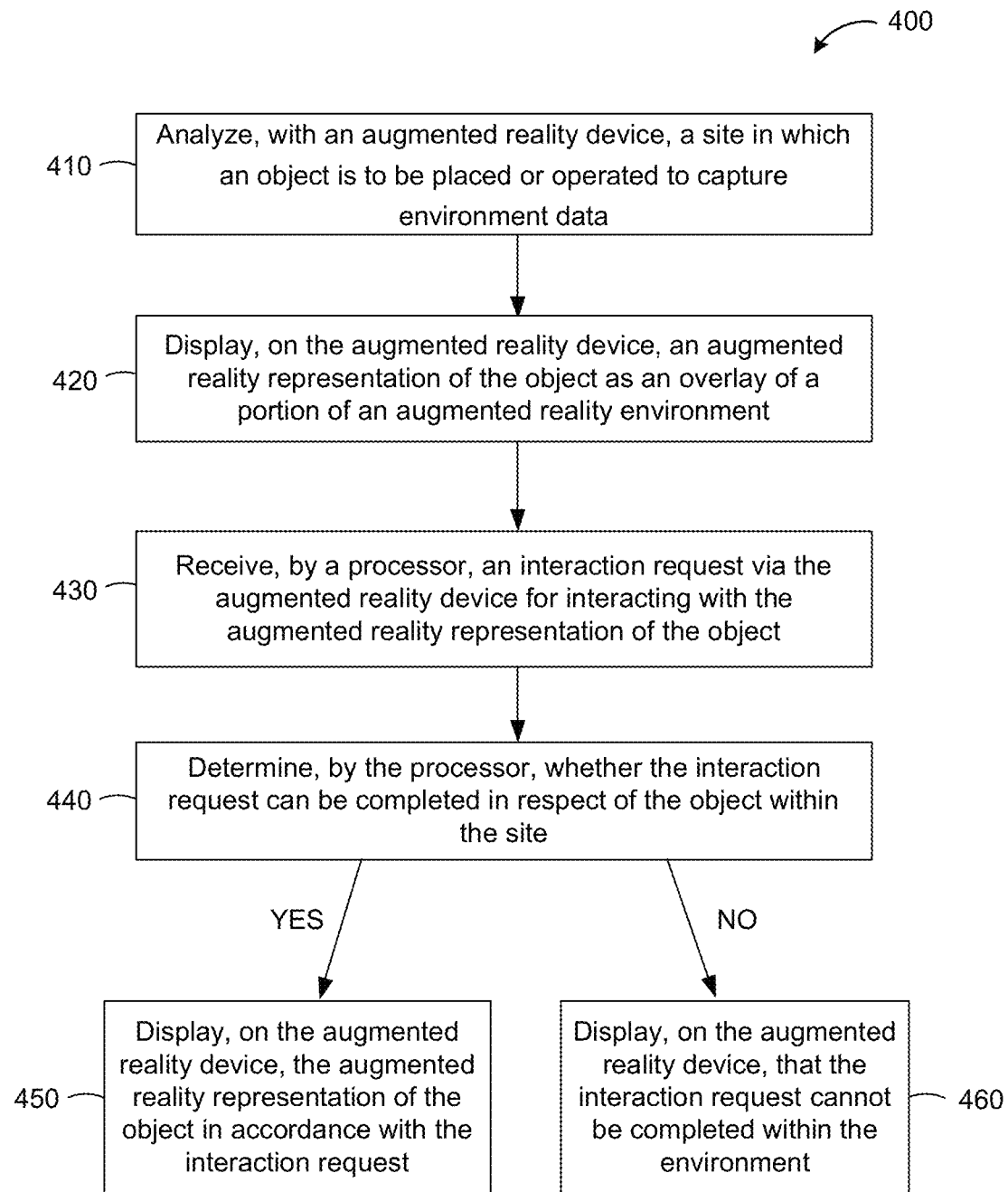
FIG. 4 is a flowchart illustrating an example method for dynamically interacting with an augmented reality environment.

Reference is now made to FIG. 4, which is a flowchart of an example method 400 for dynamically interacting with an augmented reality environment.

At 410, the dynamic interaction system 120 analyzes a site 300 in which an object is to be placed or operated in order to capture environment data related to the site 300.

As described with reference to FIG. 3, the device display 302 can be triggered in order to operate the sensor 118 of the augmented reality device 110 to capture environment data related to the site 300 when the dynamic interaction system 120 or dynamic interaction application is initiated. The device display 302 can include indicators to direct the augmented reality device 110 to be moved across the site 300 in order to capture the environment data for estimating a site boundary. During this environment data capture process, the augmented reality device 110 can operate to detect any obstacles that may restrict the functionality of the object intended for the site 300. The augmented reality device 110 may, in some embodiments, generate an augogram of the site 300 for generating the augmented reality environment of the site 300. In some embodiments, the dynamic interaction system 120 can recommend another site be analyzed to determine whether the object is better suited for another site and/or whether that object will instead fit another site should the present site 300 not be sufficient.

Figure 5A:
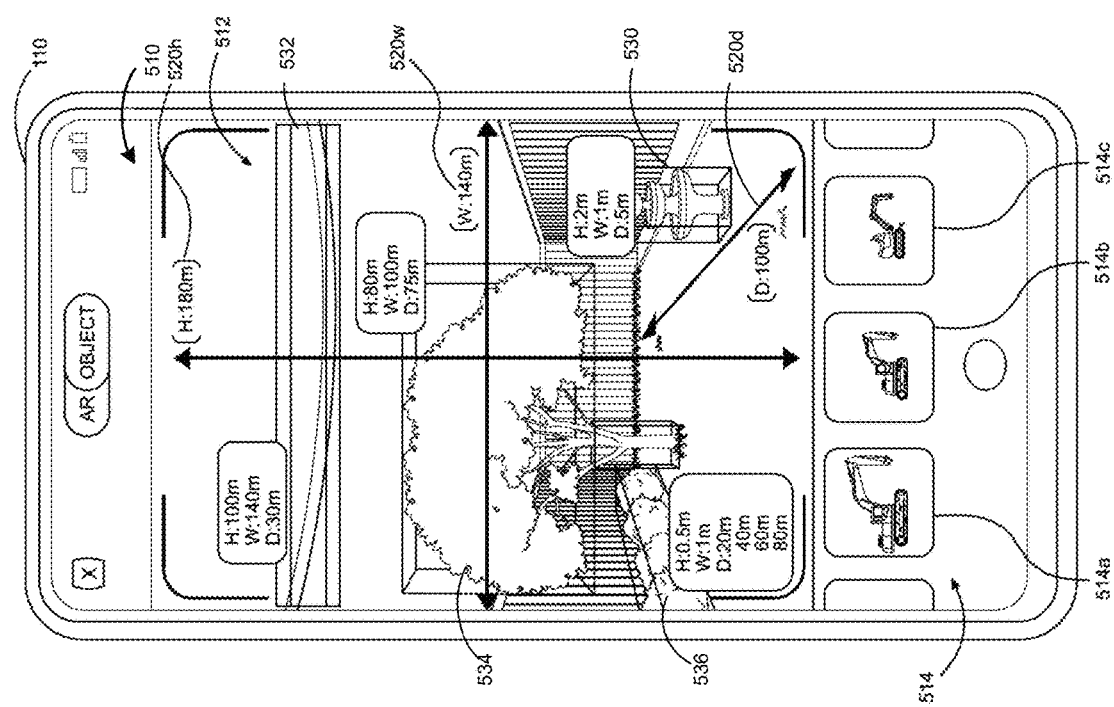
FIG. 5A shows an augmented reality environment generated for the example site of FIG. 4 displayed on an example augmented reality device in accordance with an example embodiment.

For example, FIG. 5A shows an example augmented reality environment 512 of the site 300 provided on an example augmented reality interface 510 of the dynamic interaction system 120. In this example embodiment, the augmented reality interface 510 is provided via the dynamic interaction application installed on the augmented reality device 110 but, as described herein, the augmented reality interface 510 can alternatively be provided via a web-browser application in communication with the dynamic interaction system 120. Continuing with FIG. 5A, as can be seen on the augmented reality environment 512, the dynamic interaction system 120 has estimated the site boundary (see generally a height 520h, a width 520w, a depth 520d) in which the object is to be positioned or operated with the environment data captured by the augmented reality device 110. Similarly, the dynamic interaction system 120 can also identify obstacles, such as a fountain 530, an overhead power line 532, a tree 534 and a hedge 536, and their respective estimated measurements.

The dynamic interaction system 120 may identify the obstacles by applying various image processing techniques to the environment data collected. For example, the dynamic interaction system 120 can apply image processing to the environment data to identify impressions within the site 300 when determining the site boundary at 410 (e.g., when determining any of the height, width, and/or depth estimates). The impressions within the site 300 can correspond to obstacles that may (or may not) interfere with an augmented reality representation of an object once overlaid onto the augmented reality environment 512. In some embodiments, the dynamic interaction system 120 can estimate the measurements for the impressions based on calculations with reference to the site boundary estimates. For example, the tree 534 and the fountain 530 in FIG. 5A can both be determined by the dynamic interaction system 120 as impressions with their own measurement estimates within the site boundary in order to detect any potential interferences (e.g., if the augmented reality representation of the object overlaps when placed onto the site 300). Similarly, the dynamic interaction system 120, as will be described, can continue to monitor any interaction with the augmented reality representation of the object to determine if any of those interaction would cause any overlap with the obstacles within the site 300. The interaction with the object can include interaction with components of the object, which can include a part of the object and/or addition to the object, including but not limited to accessories and/or attachments. The components of the object will vary depending on the type of object.

The example shown in FIG. 5A is for dynamically interacting with machinery within the site 300. In this example, the augmented reality interface 510 includes a machinery selection area 514 in which machinery selection buttons 514a, 514b and 514c can be provided. Selection of any of the machinery selection buttons 514a, 514b and 514c would result in the representation of the corresponding machinery be displayed as an overlay on the augmented reality environment 512. In some embodiments, the machinery can be selected prior to operating the augmented reality device 110 to capture the environment data.

In some embodiments, the dynamic interaction system 120 can continue to analyze the site 300 while the user is interacting with the augmented reality environment 512. The dynamic interaction system 120 can adjust the site boundary estimations during the movement of the augmented reality device 110 (e.g., as the user rotates the augmented reality device 110, moves around within the site 300, etc.). For example, when capturing the environmental data, the dynamic interaction system 120 or the augmented reality device 110 can determine that the user is standing too close to the site 300 and cannot populate an object within the augmented reality environment 512 properly. The dynamic interaction system 120 or the augmented reality device 110 can indicate to the user that they need to move away from the site 300 so that the environment data can be captured again. The dynamic interaction system 120 can continue to capture the environment data and estimate the site boundary during this process.

FIG. 5B shows another example augmented reality interface 510' for the example augmented reality device 110 shown in FIG. 5A. The augmented reality interface 510' includes a control interface 520 from which different types of interaction requests can be received, such as, but not limited to, via voice command input 522, tactile control input 524, hand gestures or movements 526 and/or augmented reality eyeglasses 528, or substituted by the user to enhance dynamic augmented reality object, or component part, model controls based on user needs. In some embodiments, one of the interaction requests can be assigned as the default method. Further, the control interface 520 includes a display selection icon 529, which, when selected, can trigger the dynamic interactions system 120 to switch the augmented reality device 110 to display an augmented reality environment of one site to another site, or assign a primary display to an augmented reality device with alternative display options via one or more supplemental connected augmented reality devices to dynamically operate any one or more of an augmented reality object model, or component part. In some embodiments, multiple different types of input can be received as interaction requests. In some embodiments, the selection of the input type for the interaction request can be saved.

At 420, the dynamic interaction system 120 displays an augmented reality representation 602 of the object as an overlay of a portion of the augmented reality environment 512 corresponding to the site 300.

Continuing to FIG. 6A, the excavator 610 has been selected with the machinery selection button 514a. The augmented reality device 110 now displays an augmented reality representation (shown generally at 602) of the excavator 610 as an overlay of a portion of the augmented reality environment 512. The augmented reality representation 602 can include a three-dimensional model of the machinery 610.

Figure 6B:
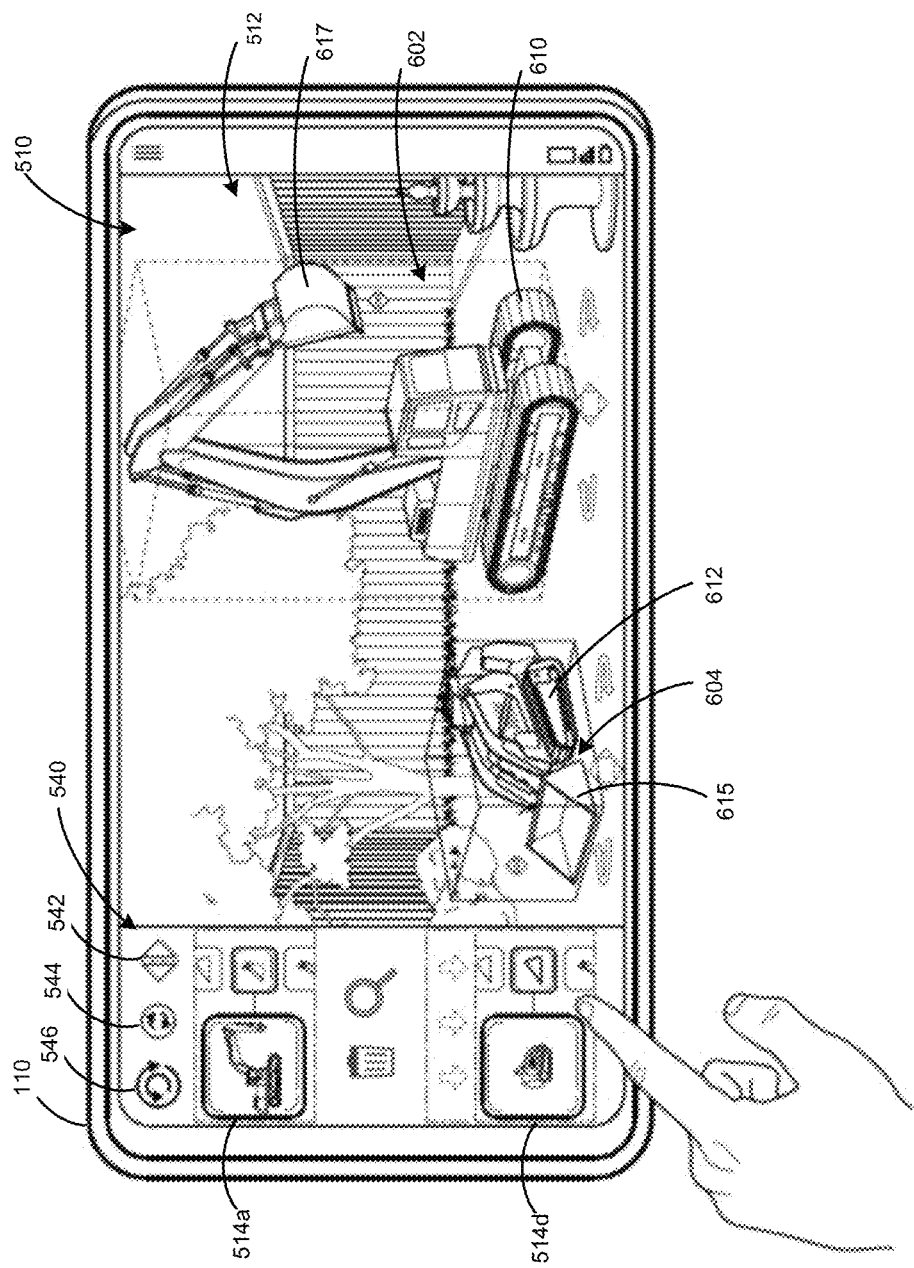
FIG. 6B shows the augmented reality environment of FIG. 5 overlaid with example representations of machineries in accordance with an example embodiment.

In another example embodiment, FIG. 6B shows the augmented reality environment 512 of FIG. 5 overlaid with example representations of machineries. The augmented reality device 110 now displays the augmented reality representation 602 of the excavator 610 as an overlay of a portion of the augmented reality environment 512 and an augmented reality representation 604 of a compact loader 612 as an overlay of a portion of the augmented reality environment 512. As shown in FIG. 6B, the augmented reality representation 602 of the excavator 610 includes an attachment 617 and the augmented reality representation 604 of the compact loader 612 includes an attachment 615.

The augmented reality interface 510 can include a control interface 540 from which different functional interaction request icons can be provided. For example, but not of limitation, the functional interaction request icons can include a mirroring icon 542, a synchronizing icon 544, and a compartmentalizing icon 546. When the mirroring icon 542 is selected, the dynamic interaction system 120 can receive interaction requests related to one or more engagements corresponding to one or more real world usages of any one or more of the objects (e.g., excavator 610 and compact loader 612 for the example shown in FIG. 6B), and/or component parts within the site 300. When the synchronizing icon 544 is selected, the dynamic interaction system 120 can receive interaction requests related to one or more engagements corresponding to one or more real world usages of any one or more of the object (e.g., excavator 610 and compact loader 612 for the example shown in FIG. 6B), and component parts, on display within the site 300 to synchronize and control multiple augmented reality representations, such as 602 and 604, based on category. When the compartmentalizing icon 546 is selected, the dynamic interaction system 120 can receive interaction requests related to engagements corresponding to one or more real world usages of any one or more of the objects (e.g., excavator 610 and compact loader 612 for the example shown in FIG. 6B), and component parts, on display within a site environment to individually control each compartmentalized augmented reality representations, such as 602 and 604, based on category within the site 300. The category can include but not limited to object type, and/or attachment or component parts types.

In some embodiments, the dynamic interactions system 120 can control the frequency of operational command prompt processing on the augmented reality representations selected (e.g., single interaction, repeating interaction, etc.). For example, an example command prompt can include selecting and placing augmented reality representations on interactive loop while dynamically controlling or operating other augmented reality representations of another object and/or component of the object within the site 300.

In some embodiments, when the augmented reality device 110 displays the augmented reality representation 602 within the augmented reality environment 512, the dynamic interaction system 120 may automatically identify obstacles within the site 300 that may limit the operation of the object or prevent the placement of the object at an area within the site 300. For example, in FIG. 7A, it can be seen that the dynamic interaction system 120 detected obstacles 702a (tree) and 702b (fountain) that can limit the operation of the machinery 610. To clearly identify the obstacles, the dynamic interaction system 120 included a general alert 710 on the augmented reality interface 510 as well as obstacle identification alerts 712a and 712b in close proximity to the respective obstacles 702a and 702b. The alerts 710, 712a, 712b are shown in FIG. 7A for illustrative purposes and it will be understood that other forms of alerts may be used.

Figure 7C:
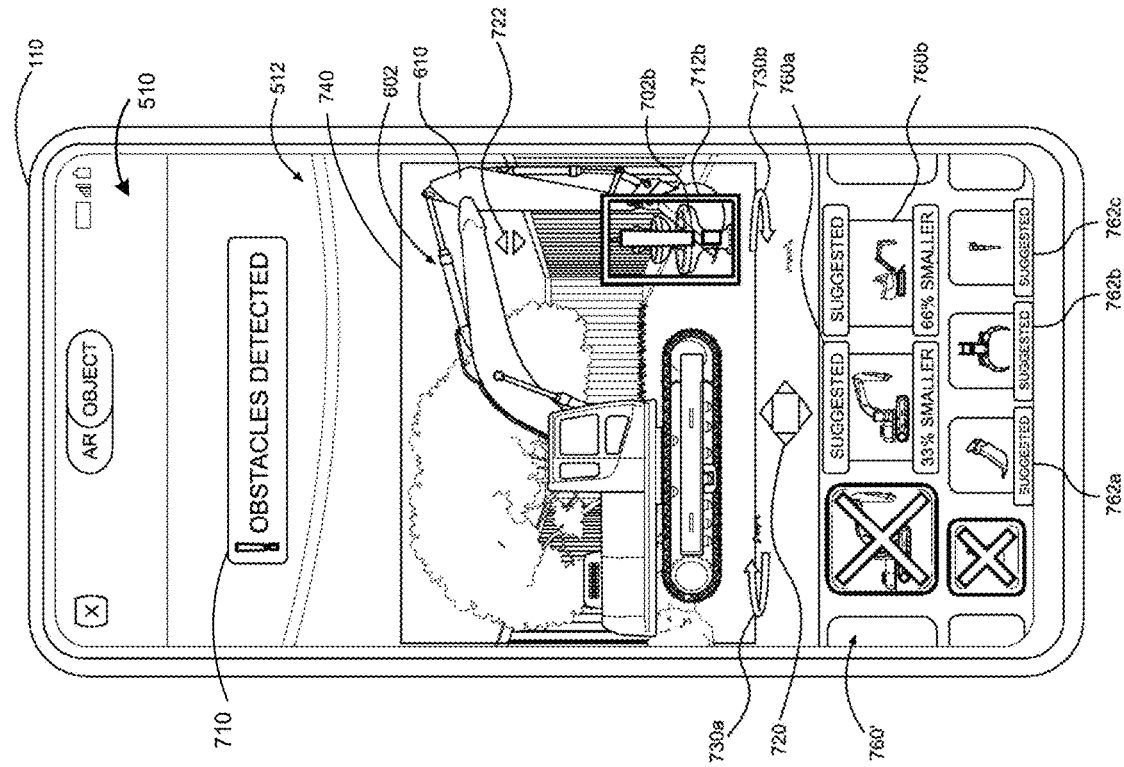
FIG. 7C shows another example augmented reality interface with another example alert generated by the dynamic interaction system in accordance with an example embodiment.
Figure 7D:
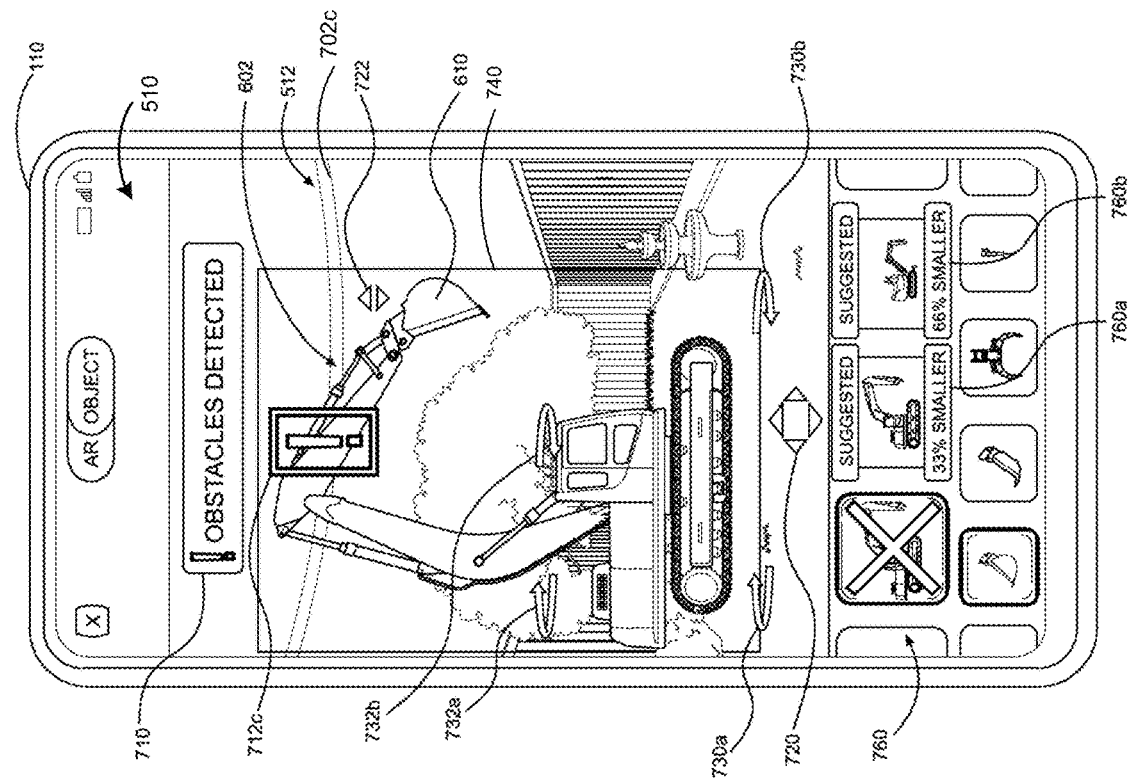
FIG. 7D shows another example augmented reality interface with another example alert generated by the dynamic interaction system in accordance with an example embodiment.
Figure 7E:
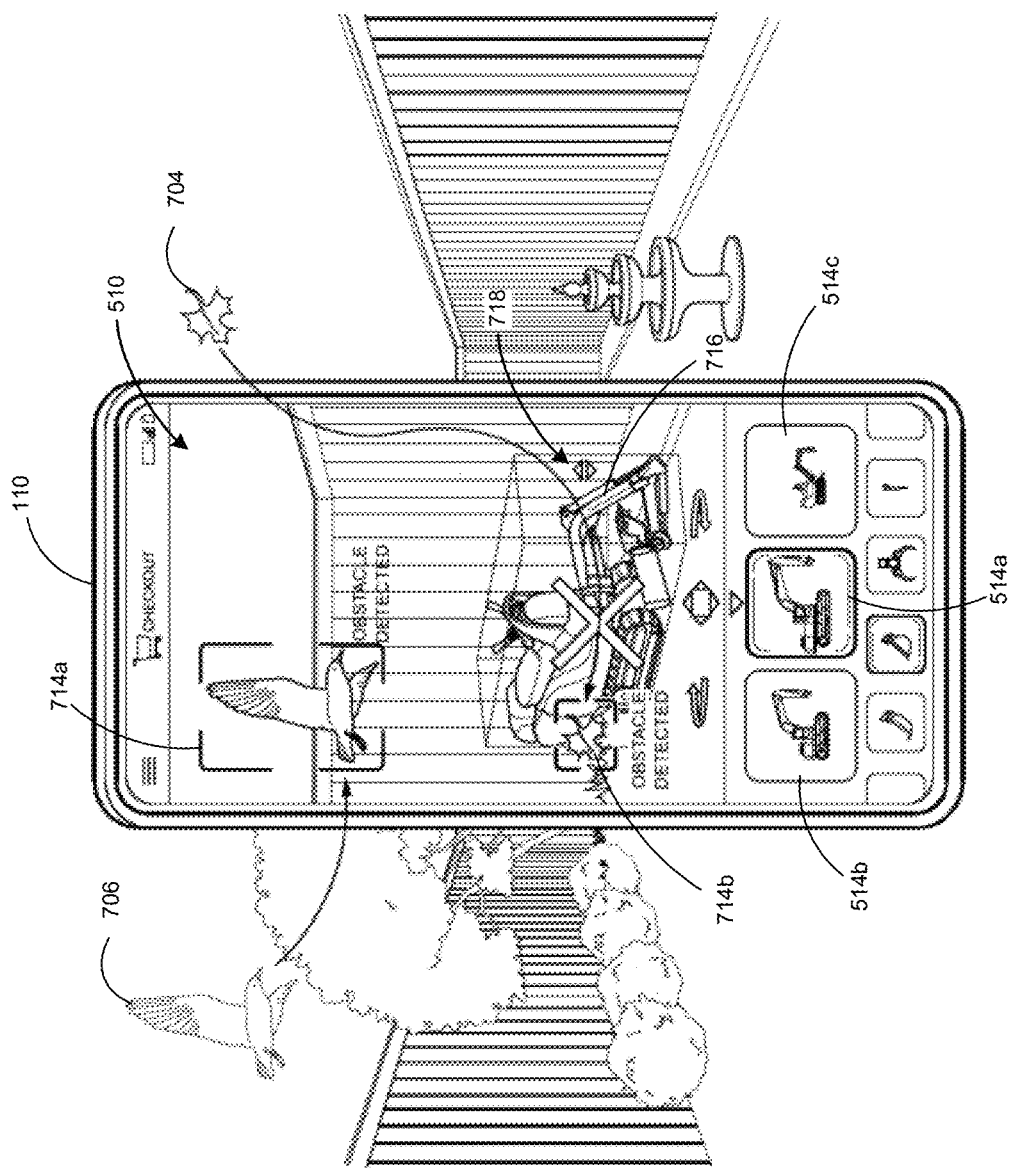
FIG. 7E shows another example augmented reality interface with another example alert generated by the dynamic interaction system in accordance with an example embodiment.

FIG. 7E shows another example augmented reality interface 510 with example alerts 714a, 714b generated by the dynamic interaction system 120. The dynamic interaction system 120 can determine that the selected excavator (via machinery selection button 514a) is unsuitable for the site 300 due to likely obstacles using trajectory forecasting of possible obstacles that are in motion, such as bird 706 (as identified by the alert 714a) and leaf 704 (as identified by the alert 714b), or dynamic detection of moving obstacles that are likely to interfere with the implementation of the interaction request. The dynamic interaction system 120 can then recommend and display an alternative machinery based on various factors, including manufacturer, performance and/or general classification criteria identified along with corresponding compatible object attachments. The general classification criteria can include but not limited to weight category, model type, performance class, fuel type, operational control type (e.g., human-operated, remote-controlled, and/or autonomous) and general operational range dimensions.

Figure 7F:
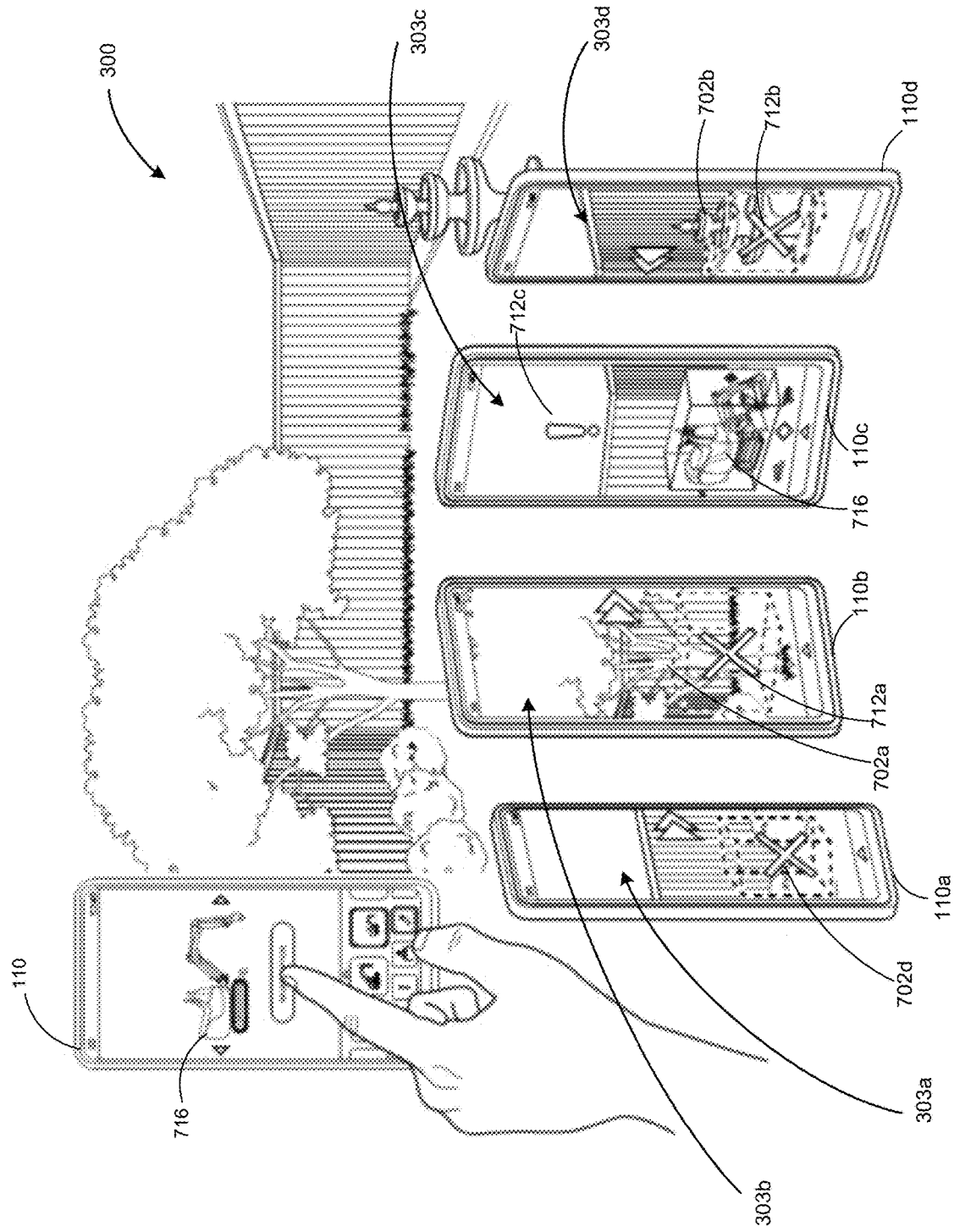
FIG. 7F shows an augmented reality device being operated for the example site shown in FIG. 3 in accordance with an example embodiment.

FIG. 7F shows the augmented reality device 110 being operated for the site 300 shown in FIG. 3. As can be shown, the dynamic interaction system 120 can prompt the user to move the device through directional prompts (e.g., from 110a showing environment data shown in device display 303a, to 110b showing 303b, to 110c showing 303c, and to 110d showing 303d) to locate an optimal location for the selected machinery 716. In some embodiments, the dynamic interaction system 120 can direct the user to a previous position to offer a suitable location for the object.

Figure 7G:
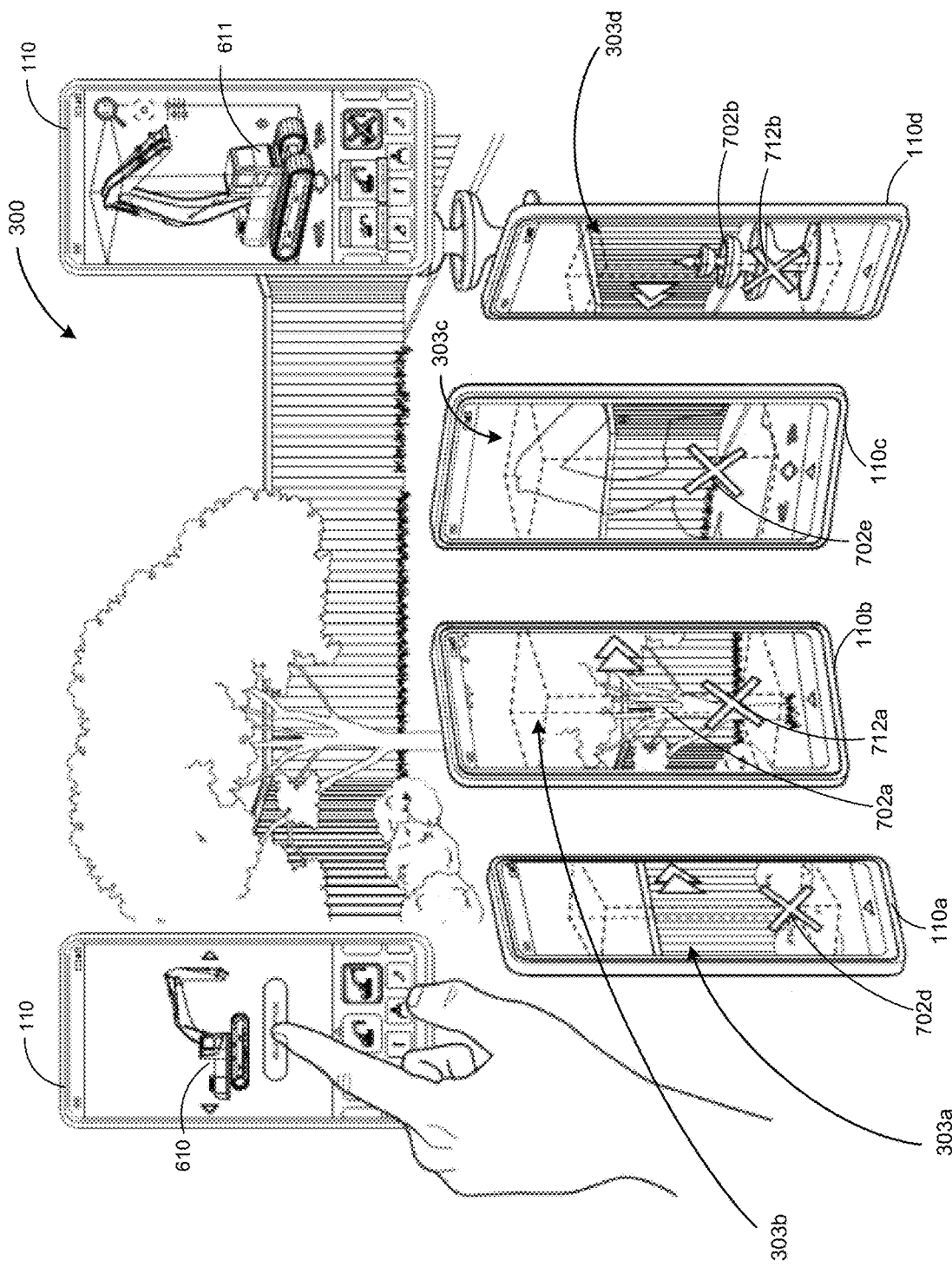
FIG. 7G shows an augmented reality device being operated for the example site shown in FIG. 3 in accordance with another example embodiment.

FIG. 7G shows the augmented reality device 110 being operated for the site 300 shown in FIG. 3 in accordance with another example embodiment. As can be seen in FIG. 7G, an interaction request received at 110 for articulating the arm of the excavator (shown generally at 611) cannot be completed within the site 300. The dynamic interaction system 120 has issued an alert 702e accordingly. The dynamic interaction system 120 can also offer suggestions (see e.g., at 611) when the interaction request cannot be completed, such as but not limited to alternative scaling recommendation option, alternative site scan recommendation option, and/or alternative object model, component part model recommendation option, and/or interaction override capability option.

At 430, the dynamic interaction system 120 receives an interaction request via the augmented reality device 110 for interacting with the augmented reality representation 602 of the object.

The interaction request can include various operations in respect of the object, such as, but not limited to, movement of the object, usage of the object and/or changes to accessories or features of the objects.

Figure 8A:
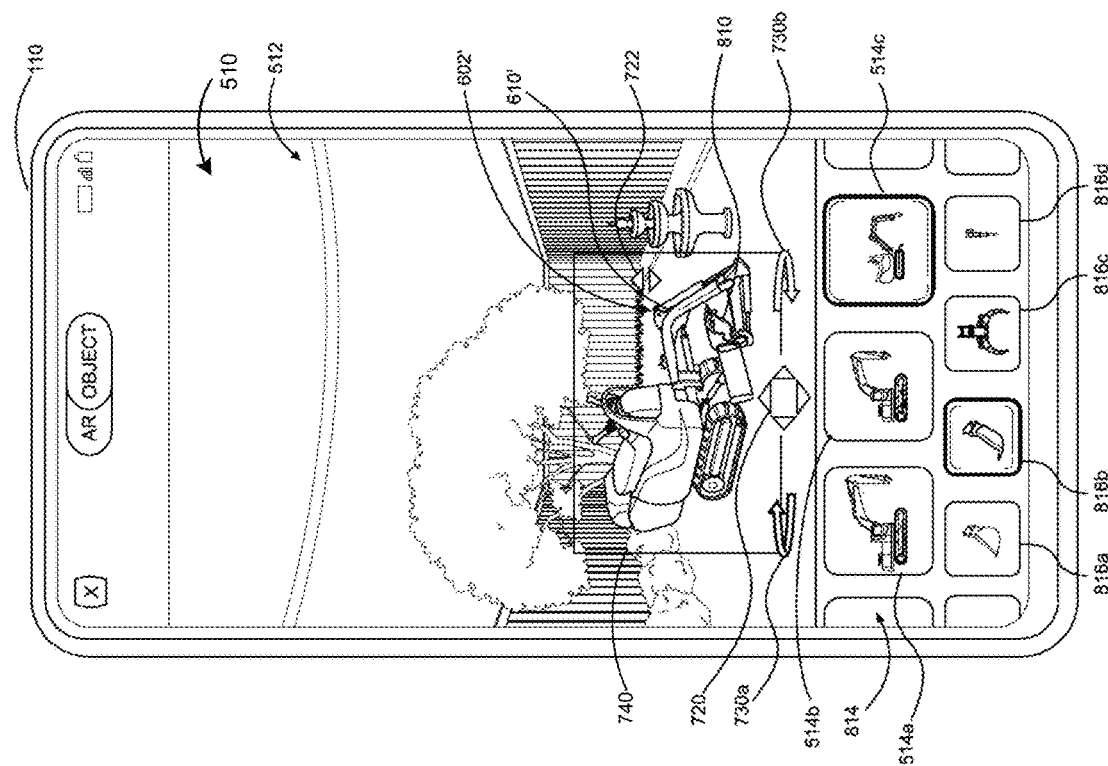
FIG. 8A shows another example augmented reality interface from which an interaction request can be received for selecting different attachments for an example machinery in accordance with an example embodiment.
Figure 8B:
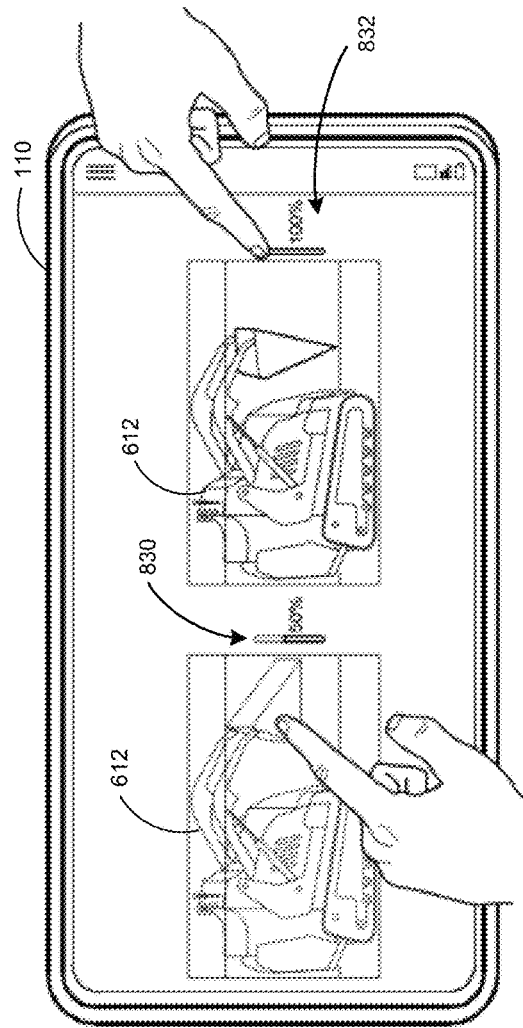
FIG. 8B shows another example augmented reality interface from which an interaction request can be received in accordance with an example embodiment.
Figure 8C:
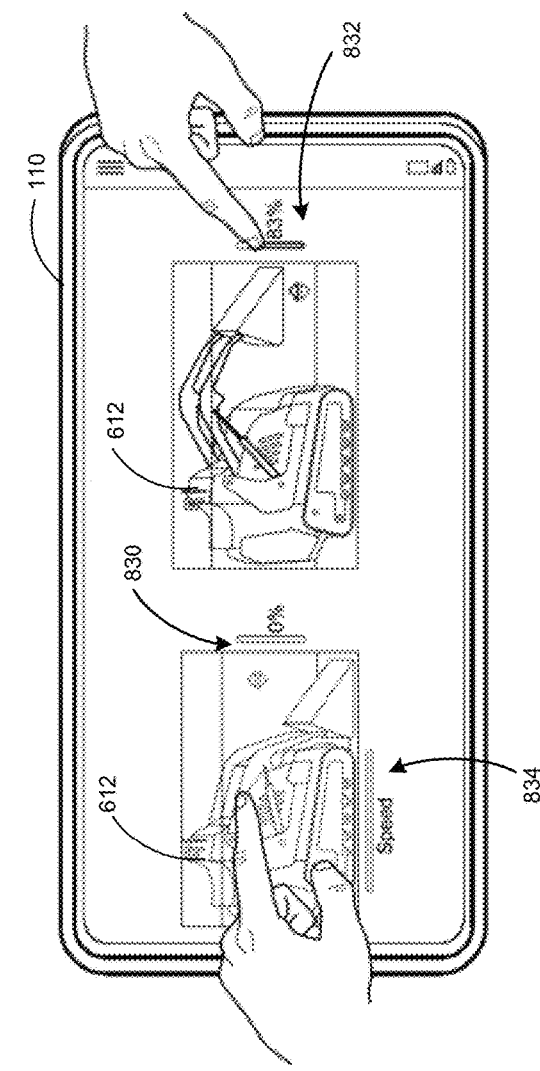
FIG. 8C shows another example augmented reality interface from which an interaction request can be received in accordance with an example embodiment.

For example, in respect of machinery 610, FIG. 7B shows several navigation controls on the augmented reality interface 510, such as movement controls 720 and 722 and rotation controls 730a, 730b, 732a and 732b, with which the user can use for providing the interaction request to the dynamic interaction system 120. The movement control 720 can be used by the user at the augmented reality device 110 to generate an interaction request for moving the machinery 610 forward or backward within the site 300, and the movement control 722 can be used by the user at the augmented reality device 110 to generate an interaction request for moving the arm of the machinery 610 upwards or downwards within the site 300. The rotation controls 730a and 730b can be used by the user at the augmented reality device 110 to generate an interaction request for rotating the machinery 610 within the site 300, and the rotation controls 732a and 732b can be used by the user at the augmented reality device 110 to generate an interaction request for rotating the arm of the machinery 610. In some embodiments, the dynamic interaction system 120 may not provide the navigation controls on the augmented reality interface 510 and instead, receive the interaction request via user inputs received directly via the touch screen on the augmented reality device 110 and/or via other data input mechanisms. Briefly, as shown in FIG. 8A, another interaction request can include a substitution of a machinery attachment on the machinery 610'. The interaction request can, in some embodiments, include multiple operations. Additional example movement controls 830, 832 and 834 are shown in FIGS. 8B and 8C in respect of machinery 612, wherein any one or more of the augmented reality object model or the compatible augmented reality model of the component (such as attachment or accessory) is capable of independent and/or combined selection and interaction requests corresponding to its full operational range in a manner consistent with the real-world manufactured engagement. In some embodiments, as shown, the example controls can include the ability to control the speed of such objects with the example movement controls in a manner which corresponds with the real-world manufactured object, or component part, to further enhance the user experience.

FIG. 8D shows another example augmented reality interface 510 from which an interaction request is received via different types of input methods. For example, in FIG. 8D, the dynamic interaction system 120 can receive input via tactile control input (see e.g., icon 524). The user can also use augmented reality eyeglasses 111 as display. Similarly, in FIG. 8E, the dynamic interaction system 120 can receive input via voice command input 522. The augmented reality eyeglasses 111 can be used to dynamically interact with the augmented reality models on display through various different methods, such as but not limited to, ocular tracking, head movement tracking and/or hand gesture tracking. In some embodiments, hand gesture tracking through the augmented reality eyeglasses 111 may be used to control scaling of the augmented reality object, or component, model(s) on display. The dynamic interaction system 120 can also receive user inputs to dynamically select and/or substitute the types of input methods to control the augmented reality object, or component part, model(s) on display, for, without limitation, various interactions with the model of the object, such as but not limited to scaling, voice command prompts or adjusting display settings across connected devices. The dynamic interaction system 120 can apply a natural language processing model to interpret the voice command input. For example, in FIG. 8E, the voice command input (see e.g., icon 522) was to "raise accessory 50%", the dynamic interaction system 120 proceeded to raise the bucket of the machinery 612" by 50% after processing the voice command input in a manner corresponding to its real-world manufactured operating range. The voice command input can trigger a full spectrum dynamic operation and control, such as, but not limited to, substituting any one or more compatible object, or component part, models; interchangeably browse, select and/or assign the interaction method type for an interaction request using the augmented reality device 110 (e.g., using voice prompts to switch interaction type assignments—assign voice comment to a component part model, assign hand gesture to object model, assign tactile touch to swivel functionality, etc.); using voice command prompts to select and complete a transaction request through the augmented reality device 110; using voice command prompts to connect multiple augmented reality devices 110 to synchronize control of the augmented reality object or component part models on any one or more displays; and/or receiving an override input as a voice command input via the augmented reality device 110 to initiate completion of the interaction request in response to the indication that the interaction request cannot be completed within the site. Further, as shown in FIGS. 8D and 8E, the augmented reality device 110 can connect to one or more other devices via a wireless connection (e.g., via the network 140).

FIG. 7B also shows an example interaction boundary 740. The interaction boundary 740 is a visual tool for more clearly illustrating to the user on the augmented reality device 110 various interface controls that may be available for initiating the interaction request with the machinery 610, such as movement control 722 and rotation controls 732a and 732b. It will be understood that the interaction boundary 740 serves as a visual aide and may not be provided in some embodiments.

At 440, the dynamic interaction system 120 determines, based on the captured environmental data, whether the interaction request can be completed in respect of the object within the site 300.

When the dynamic interaction system 120 receives the interaction request via the augmented reality device 110, the dynamic interaction system 120 assesses whether the operation(s) within the interaction request can be completed within the site boundary of the site 300. As described with reference to FIG. 3, the environment data captured at 410 can be used to estimate the site boundary as well as to identify any obstacles that may restrict the functionality of the object intended for the site 300.

FIG. 7C, for example, shows the interaction request involves an upward articulation of the arm of the machinery 610. However, the dynamic interaction system 120 determined that the requested upward movement of the arm would exceed the site boundary due to an obstacle 702c (overhead power line). The obstacle 702c in this example embodiment is also identified with an obstacle identification alert 712c.

Continuing from 440, if the dynamic interaction system 120 determines that the interaction request cannot be completed in respect of the object within the site 300, the dynamic interaction system 120 proceeds to 460 to indicate on the augmented reality device 110 that the interaction request cannot be completed within the site 300. In the example shown in FIG. 7C, the dynamic interaction system 120 can indicate that the operating range of the machinery 610 is restricted by the site boundary and/or the obstacle 702c within the site 300. The dynamic interaction system 120 can, in some embodiments, also indicate that the machinery 610 is unsuitable for the site 300 (e.g., an interference will take place). In some embodiments, the user may choose to override the alerts generated in respect of the interference(s) and proceed with the interaction request. The dynamic interaction system 120 can recommend an alternative machinery suitable for the site 300. As will be described, the recommendation can be for an alternative machinery and/or a component of the machinery, such as an attachment.

To determine the alternative machinery for the site 300, the dynamic interaction system 120 can determine any one or more applicable or relevant object classification type categories such as, but not limited to, weight category, model type, performance class, fuel type, operational control type (e.g. human-operated, remote-controlled or autonomous) and general operational range dimensions for suitable types of machinery, or components, for the site boundary. In some embodiments, the user may select from the augmented reality device 110 the type of classification type to utilize for the purpose of generating relevant alternative augmented reality model recommendations. Machinery, for example, is often divided into weight categories, or size groups, depending on various factors, such as their size and operating space required. For instance, four classes of excavators may be available, such as (i) mini or compact excavators, (ii) midi excavators, (iii) standard excavators, and (iv) large excavators.

Mini or compact excavators can be suitable for working in tight spaces around or in existing structures, landscaping and sidewalks. In some jurisdictions, mini or compact excavators can be transported by Class 1 or 2 size trucks which require no Commercial Drivers License. Mini or compact excavators are versatile and fuel-efficient, but lack the reach, dig depth and lift capacity of standard-sized models. Midi excavators can be designed to deliver more dig depth, reach and power to tight work areas. Some models are available with zero or near-zero tail swing. Standard excavators can often be the most common excavators in commercial construction. They are a sizable step up in power and capacity, while remaining maneuverable and versatile. The hydraulics available in standard excavators can handle multiple tools but the heavier working weight increases hydraulic pressure and requires larger trailers for transport. Large excavators are the most powerful choice for heavy construction, demolition and truck loading. Oversized trucks and trailers are required for transport of large excavators, and they occupy significant floor space when not in use. Large excavators require high utilization to get steady return on machine investment.

Based on the site boundary determined with the environment data captured, the dynamic interaction system 120 can determine the appropriate one or more object classification type categories that may be suitable for the site 300. If weight category classifications are used the dynamic interaction system 120 can then determine whether the machinery 610 is available in the suitable weight category. FIG. 7C, for example, includes a recommendation selection area 760 from which recommended machinery selection buttons 760a and 760b are displayed. As described with reference to FIG. 7C, the dynamic interaction system 120 determined that the machinery 610 is too large for the site 300 and identified another weight category that is suitable for the site 300. The recommended machinery selection buttons 760a and 760b correspond to smaller machinery that would not be limited by the obstacles 702a, 702b and 702c while also offering similar, if not equivalent, functionality as the machinery 610.

The dynamic interaction system 120 can, in some embodiments, recommend components (including parts, attachments, and/or accessories) that may be more suitable for the site 300 and/or the task(s) intended for the object to be placed in the site 300. FIG. 7D shows that the dynamic interaction system 120 detected the obstacle 702b (fountain). The dynamic interaction system 120 can determine that the bucket attachment on the machinery 610 is unsuitable for the site 300 as it will not be able to navigate from the obstacle 702b. The dynamic interaction system 120 can then suggest alternative attachments, as shown in the updated recommendation selection area 760' in which recommended attachment selection buttons 762a, 762b and 762c are displayed. The alternative attachments may be based on the compatible category and/or manufacturer of the machinery 610. In some embodiments, the dynamic interaction system 120 may offer recommendations on attachments in an effort to upsell to the user.

In some embodiments, the recommendations offered by the dynamic interaction system 120 may be filtered by the user based on various categories, such as, but not limited to, manufacturer.

Once the alternative machinery and/or attachment is selected for the site 300, the dynamic interaction system 120 may then prompt the user to complete the transaction in respect of the alternative machinery as will be described with reference to FIGS. 9A and 9B.

In some embodiments, the dynamic interaction system 120 may request that the site 300 be analyzed again at 410 with the augmented reality device 110 when it is determined that the interaction request cannot be completed. This may improve the quality and increase the amount of environment data captured in respect of the site 300 and enable improved recommendations offered by the dynamic interaction system 120.

Continuing from 440, if the dynamic interaction system 120 determines that the interaction request can be completed in respect of the object within the site 300, the dynamic interaction system 120 proceeds to 450 to display the augmented reality representation 602' of the object in accordance with the interaction request on the augmented reality device 110. FIG. 8A shows the augmented reality interface 510 includes an extended machinery selection area 814 in which various attachment selection buttons 816a, 816b, 816c and 816d are provided. In this example, the dynamic interaction system 120 received the interaction request for changing the machinery 610 to a smaller size, such as machinery (corresponding to recommended machinery selection button 760b) and replacing the bucket attachment with the tooth bucket attachment 810 (corresponding to attachment selection button 816b). The augmented reality representation 602' shows the new machinery 610' with the tooth bucket attachment 810.

In some embodiments, the dynamic interaction system 120 can also provide sensory feedback to the user via the augmented reality device 110 as the interaction takes place, such as sound of motor when the machinery 610 is moving or safety warning alert sounds which mirror the real-life manufactured equivalent models.

In some embodiments, the dynamic interaction system 120 can enable operator-training applications. The dynamic interaction system 120 may incorporate projection mapping technology. Projection mapping can augment real-world objects with which users can interact to enable machinery operation training. For example, operator testing cabins can be outfitted with augmented reality sensors (e.g., cameras) to scan the environment to offer the operator a cabin view which would mimic operation of the machinery 610 in a real-life environment while actually on-site.

Figure 9B:
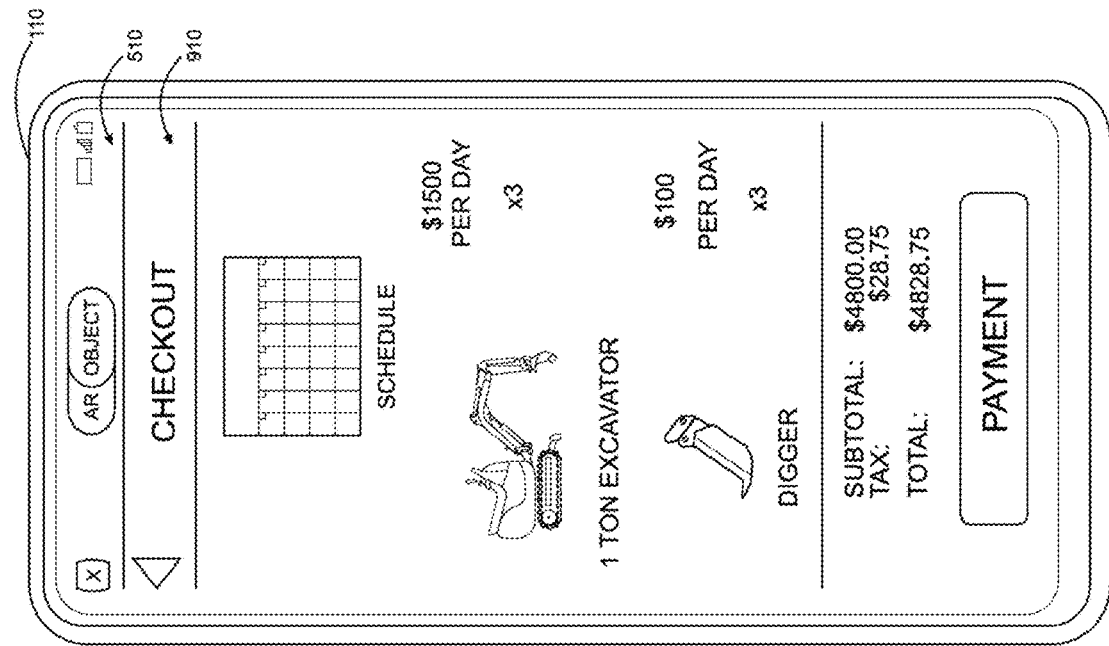
FIG. 9B shows an example checkout interface for completing a transaction in respect of the machinery.
Figure 9A:
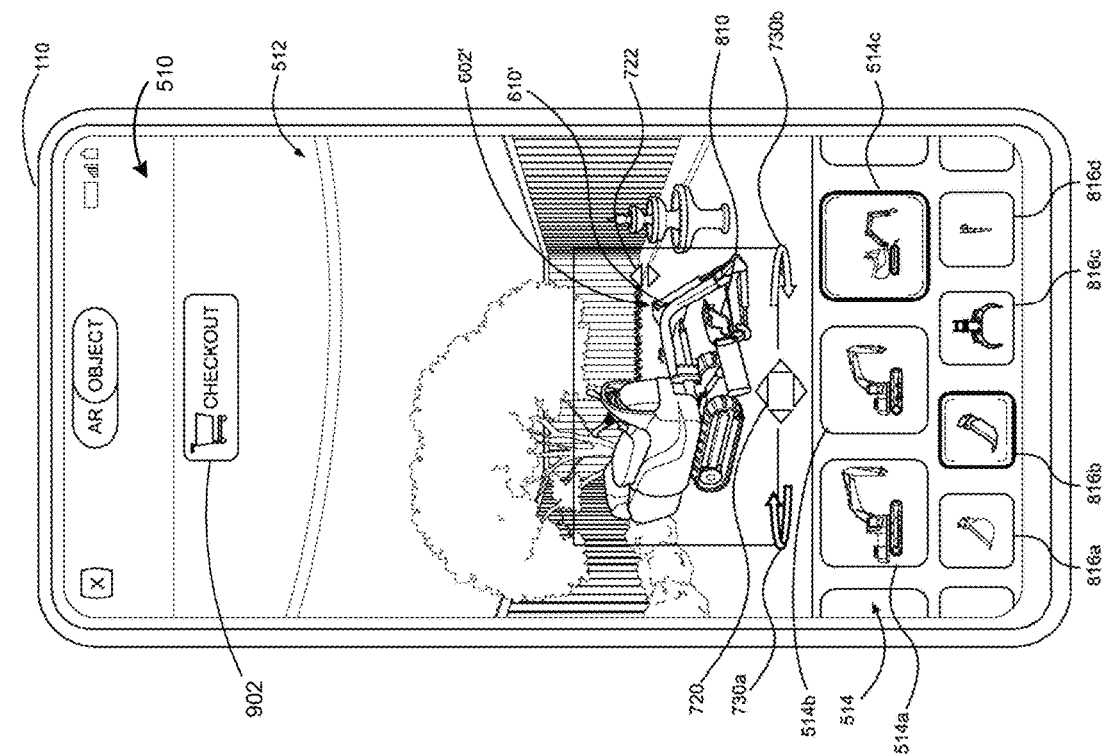
FIG. 9A shows another example augmented reality interface from which a transaction involving the example machinery can be conducted.

Reference will now be made to FIGS. 9A and 9B. FIG. 9A shows that the augmented reality interface 510 can include a checkout button 902 so that the user can complete a transaction involving the machinery 610' and/or the attachment 810. The transaction can involve acquiring the machinery 610' and/or the attachment 810 or another type of transaction, such as but not limited to, a lease, rental, or auction. When the checkout button 902 is selected, the dynamic interaction system 120 can then direct the user to a checkout interface 910 for completing the transaction. In some embodiments, the augmented reality interface 510 may be terminated when the checkout process is initiated so that the transaction completes via the web browser application from which the operation of the dynamic interaction system 120 was initiated.

Figure 9C:
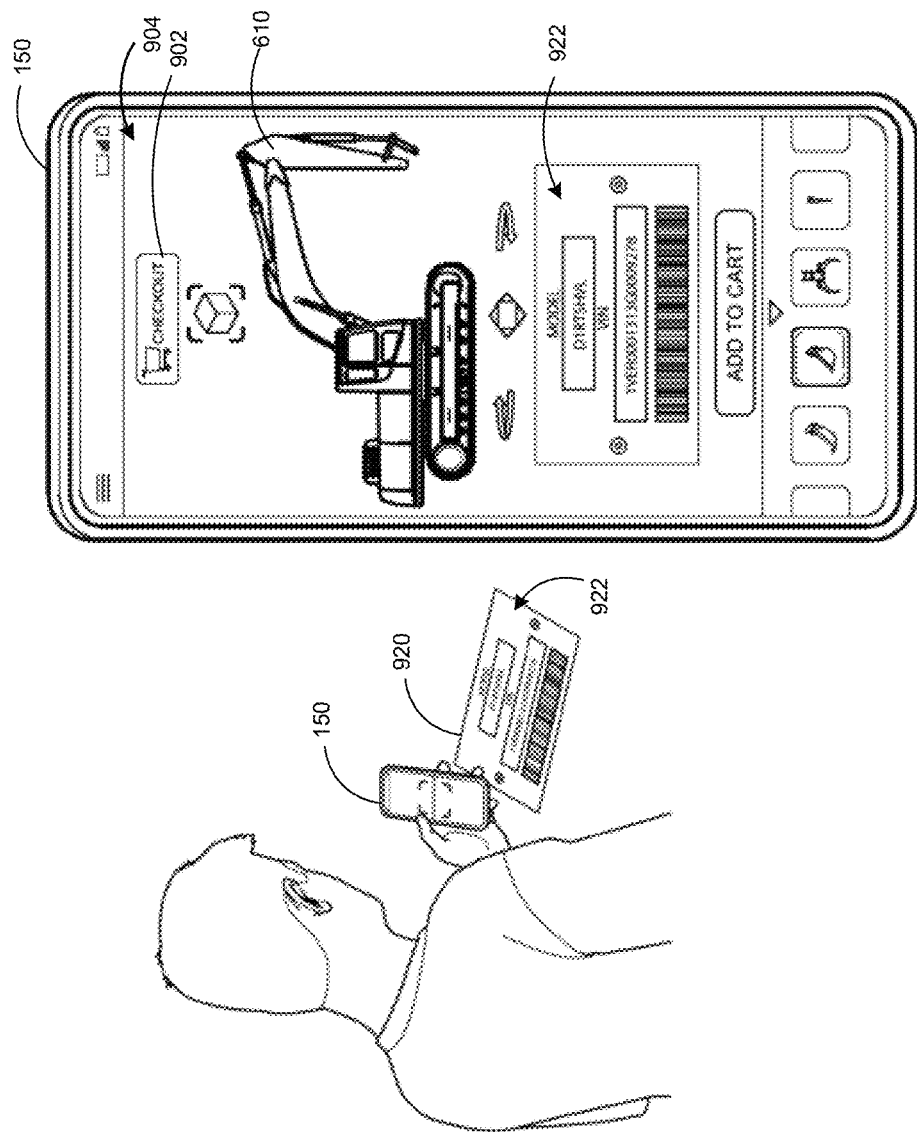
FIG. 9C shows an example transaction interface from which a transaction involving the example machinery can be conducted in accordance with an example embodiment.
Figure 9D:
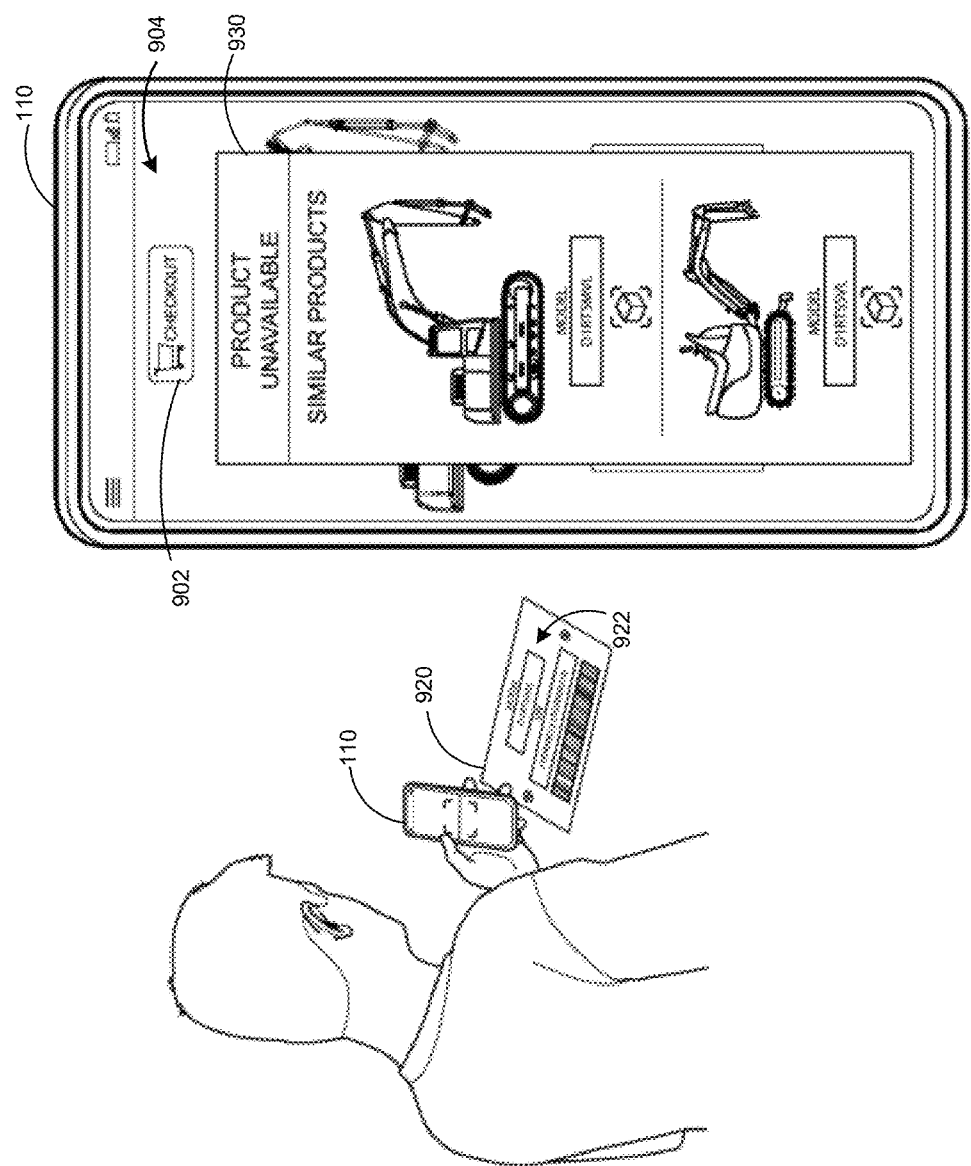
FIG. 9D shows the example transaction interface from which a transaction involving the example machinery can be conducted in accordance with another example embodiment.

FIGS. 9C and 9D show an example transaction interface 904 from which a transaction involving the example machinery 610 can be conducted. For example, the dynamic interaction system 120 can receive the details of the machinery 610 via a machinery identifier 922, such as displayed on identifier card 920, after obtained via the user device 150. The user device 150 can be the augmented reality device 110. The machinery identifier 922 can correspond to a manufacturer identifier, which can be used to cross-reference against any one or more of the corresponding augmented reality model library, specification database and the internet to identify, select and/or display the machinery 610.

In some embodiments, as shown in FIG. 9D, the machinery 610 corresponding to the machinery identifier 922 may not be available. The dynamic interaction system 120 can then offer alternative suggestions, such as at 930, for the machinery by identifying the closest comparable object or component part model(s) for the user to explore, select, display and operate on the augmented reality device 110 within the site 300.

Figure 10B:
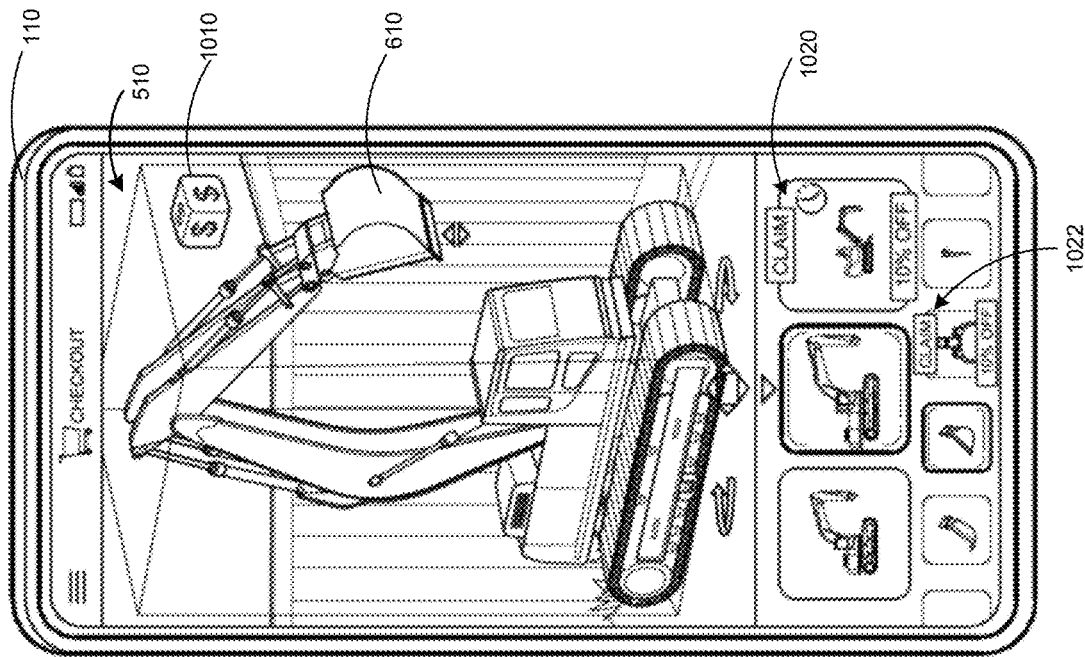
FIG. 10B shows another example augmented reality interface with example advertisements generated by the dynamic interaction system in accordance with an example embodiment.
Figure 10A:
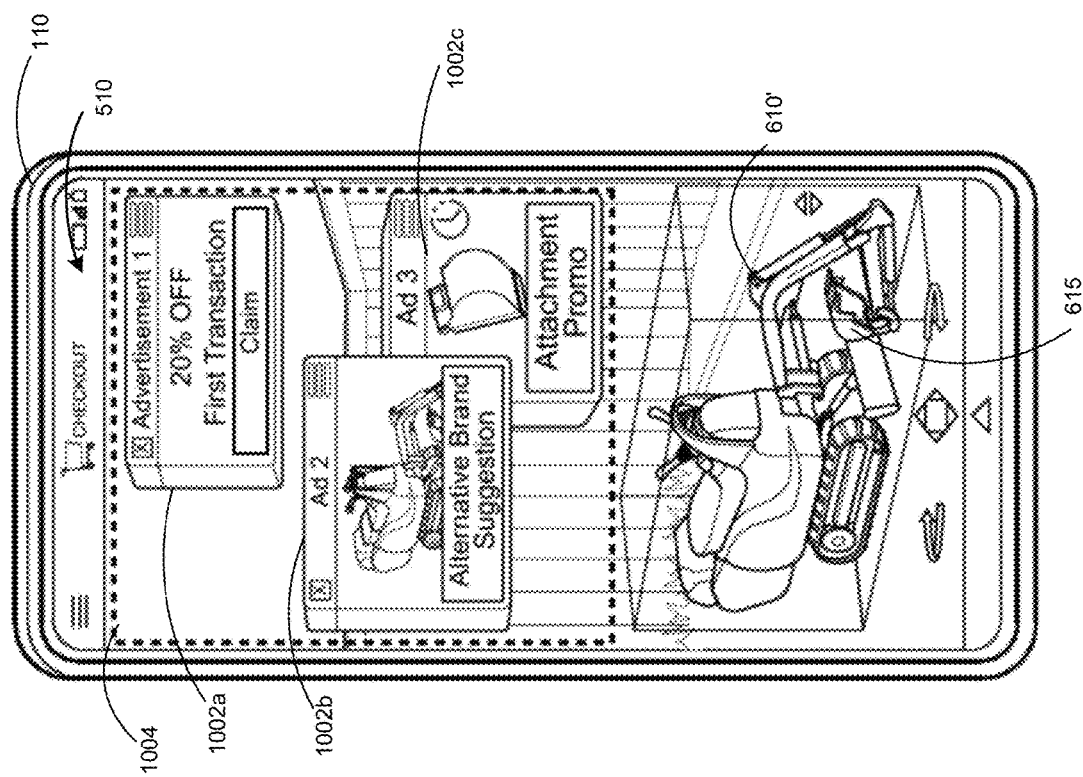
FIG. 10A shows an example augmented reality interface with example advertisements generated by the dynamic interaction system in accordance with an example embodiment.

Reference will now be made to FIGS. 10A and 10B. As shown in FIG. 10A, the dynamic interaction system 120 can display on the augmented reality interface 510 advertisements 1002a, 1002b, 1002c. Based on the site boundary determined with the environment data captured by the augmented reality device 110, the dynamic interaction system 120 can determine the available non-augmented two or three-dimensional space 1004 within the site environment on display through the augmented reality device 110 which is not occupied by the user-selected augmented reality object or model of that augmented reality object for displaying advertisements, such as 1002a, 1002b, 1002c. The dynamic interaction system 120 can then select one or more advertisements 1002a, 1002b, 1002c based on, at least, the available non-augmented space and the augmented reality object or model of that object selected for display. In the example shown in FIG. 10A, the object is a machinery 610' with a compatible attachment 615. The advertisements 1002a, 1002b, 1002c are shown in FIG. 10A for illustrative purposes and it will be understood that other advertisements may be used. It will also be understood that advertisements can include, but not limited to, promotions and/or advertisement prompts.

In some embodiments, the dynamic interaction system 120 can detect when there will be insufficient non-augmented two- or three-dimensional space 1004 to display on the augmented reality device 110 advertisements such as in the manner demonstrated in FIG. 10A and dynamically modify the advertisement prompts to embed within the operational range of the augmented reality object or associated model on display 1010. Any one or more of the interaction requests or the overall size of the selected and displayed augmented reality object, or associated model, may be used to analyze, detect and automate through the augmented reality device 110 when the advertisement display mode shown in FIG. 10A will convert to the embedded mode shown in FIG. 10B. Embedded advertisements within the two- or three-dimensional operational range of the corresponding to the augmented reality representation of the object 610 while an interaction is taking place is shown in FIG. 10B. Once it is determined that an interaction request can be completed, the dynamic interaction system 120 can determine the available space 1004 within the site 300. The dynamic interaction system 120 can then select one or more advertisements corresponding to the object, such as the embedded advertisement 1010 in the example of FIG. 10B, to display on the augmented reality interface 510 of the augmented reality device 110. In some embodiments, the one or more advertisements can be the same advertisements that were displayed prior to the interaction request which resulted in the conversion to embedded advertisements. In some embodiments, embedded advertisements may be the default display mode based on any one or more of the user-selected augmented reality object, or associated model, on display or the interaction requests received relating to the same. Depending on the interaction request, the dynamic interaction system 120 can determine whether the one or more advertisements can be displayed without interfering with the interaction request. As described with reference to FIG. 3, the environment data captured at 410 can be used to estimate the site boundary as well as to identify any obstacles that may restrict the functionality of the object intended for the site 300. In some embodiments, the dynamic interaction system 120 can also determine whether the display of advertisements restricts an operating range of the object in accordance with the interaction.

FIG. 10B, for example, shows the interaction request involves an upward articulation of the arm of the machinery 610. However, the dynamic interaction system 120 can determine that the advertisements 1002a, 1002b, 1002c shown in FIG. 10A would interfere with the requested upward movement of the arm resulting in the dynamic conversion of any one or more of the advertisements into an embedded advertisement (as shown in FIG. 10B) within the operational range of the augmented reality object or associated model.

If the dynamic interaction system 120 determines that the interaction request cannot be completed in respect of the object within the site 300, the dynamic interaction system 120 proceeds to adjust the display of advertisements, such as 1002a, 1002b, 1002c in accordance with the interaction taking place.

In the example embodiment shown in FIG. 10B, the dynamic interaction system 120 can adjust the display of advertisements by displaying an embedded advertisement 1010 within the augmented reality representation of the object 610 in accordance with the interaction request. The embedded advertisement 1010 can be selected via the augmented reality device 110 to display one or more associated advertisements. The embedded advertisement 1010 can be suitable for augmented reality environments in which the dynamic interaction system 120 has identified a small amount of available space 1004 and/or the dynamic interaction system 120 expects a large variable movement from the interaction requests to the augmented reality representation of the object being displayed. In some embodiments, the advertisements are embedded within the augmented reality representation of the object in accordance with the interaction request to complete any restrictive or potentially restrictive interaction request.

In some embodiments, the dynamic interaction system 120 can automatically process, identify, select and display one or more advertisements within the site 300 as an overlay of a portion of the augmented reality representation of the object if there is insufficient available space to display the selected one or more advertisements. For example, if the object is enlarged on the augmented reality interface 510 and reduces the available space 1004 for displaying the selected one or more advertisements, the dynamic interaction system 120 can automatically display the advertisement as an overlay of a portion of the augmented reality representation of the object in accordance with the interaction request.

Figure 11A:
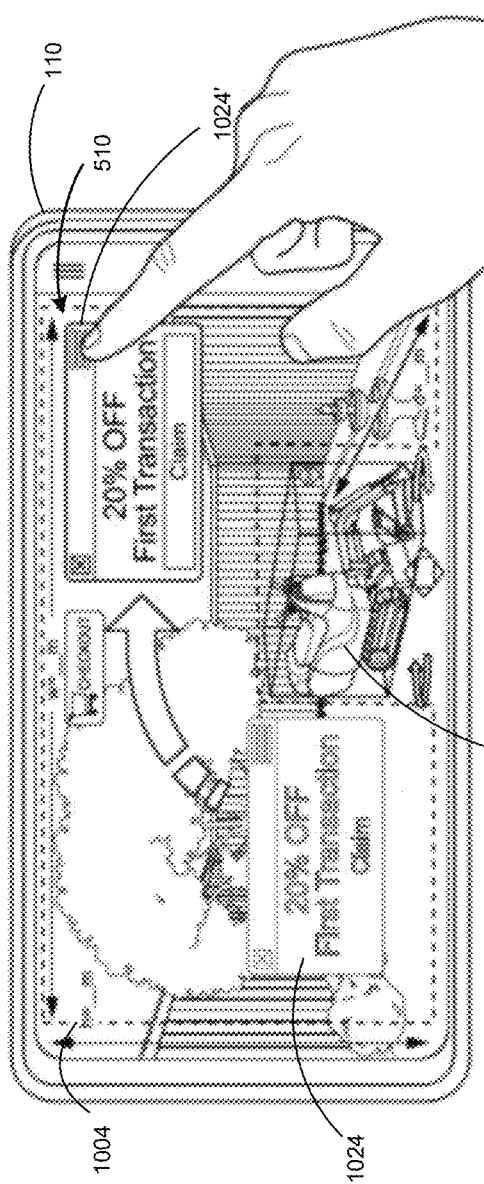
FIG. 11A shows an example augmented reality interface with an example advertisement displayed in accordance with an example embodiment.
Figure 11B:
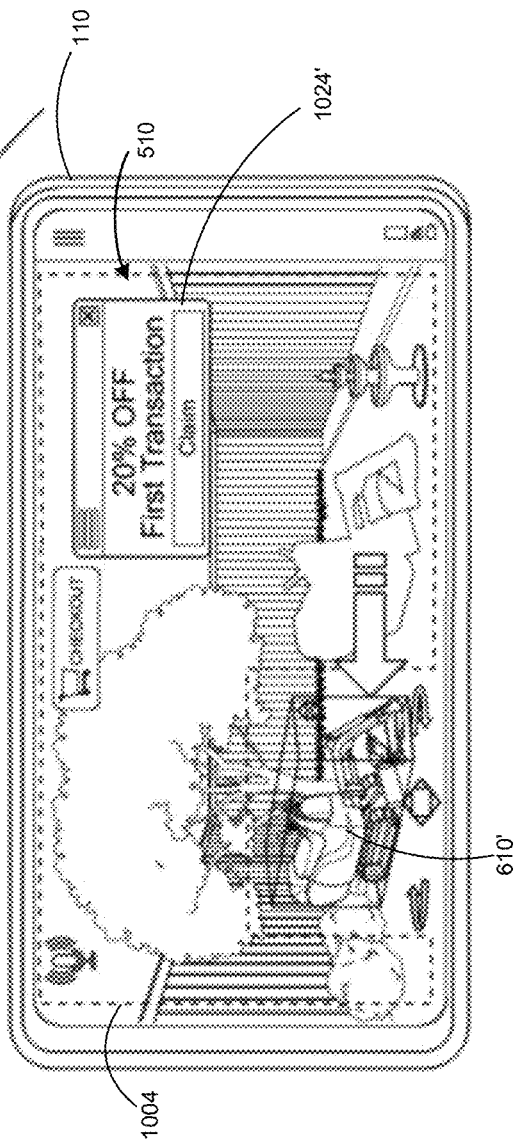
FIG. 11B shows FIG. 11A following an interaction in accordance with an example embodiment.

The advertisements, in some embodiments, are dynamically adjustable by the user, as shown in FIGS. 11A and 11B. For example, if the user wanted to minimize interference with a contemplated user interaction request, the user can move the advertisement 1024 within the available space 1004 of the site 300 to 1024' (as shown in FIG. 11A), so that the resulting interaction request to move the machinery 610' would not be affected by the advertisement 1024. Users may also interact with the dynamically adjustable advertisements using various input prompt types such as, without limitation, voice control commands and tactile interactions.

In some embodiments, the dynamic interaction system 120 can select, display and/or substitute the advertisement on display based on user profile information, interaction request history, interaction requests in the current session for the object on display.

In some embodiments, the advertisements can be limited time offers (such as 1020 in FIG. 10B). The dynamic interaction system 120 can display the advertisement 1020 in any one or more of the available space 1004, the augmented reality device interface controls 610 or in an embedded advertisement scenario for a determined period of time to incentivize the user to complete a transaction. For example, a user may be experimenting with a certain type of component of an object. The dynamic interaction system 120 can generate various advertisements in relation to the component part brand, related alternative options to consider and/or pricing incentives to increase transaction conversion rates. The advertisements can be adjusted and as more interaction requests are received by the dynamic interaction system 120, the user can become more informed on success likelihood of the component, object and/or the advertisements themselves. For example, vehicle manufacturers can generate dynamic manufacturer and/or dealership level advertisements to display through an augmented reality device interface while users explore potential vehicle model options and functionality through a selected augmented reality site environment.

Figure 12:
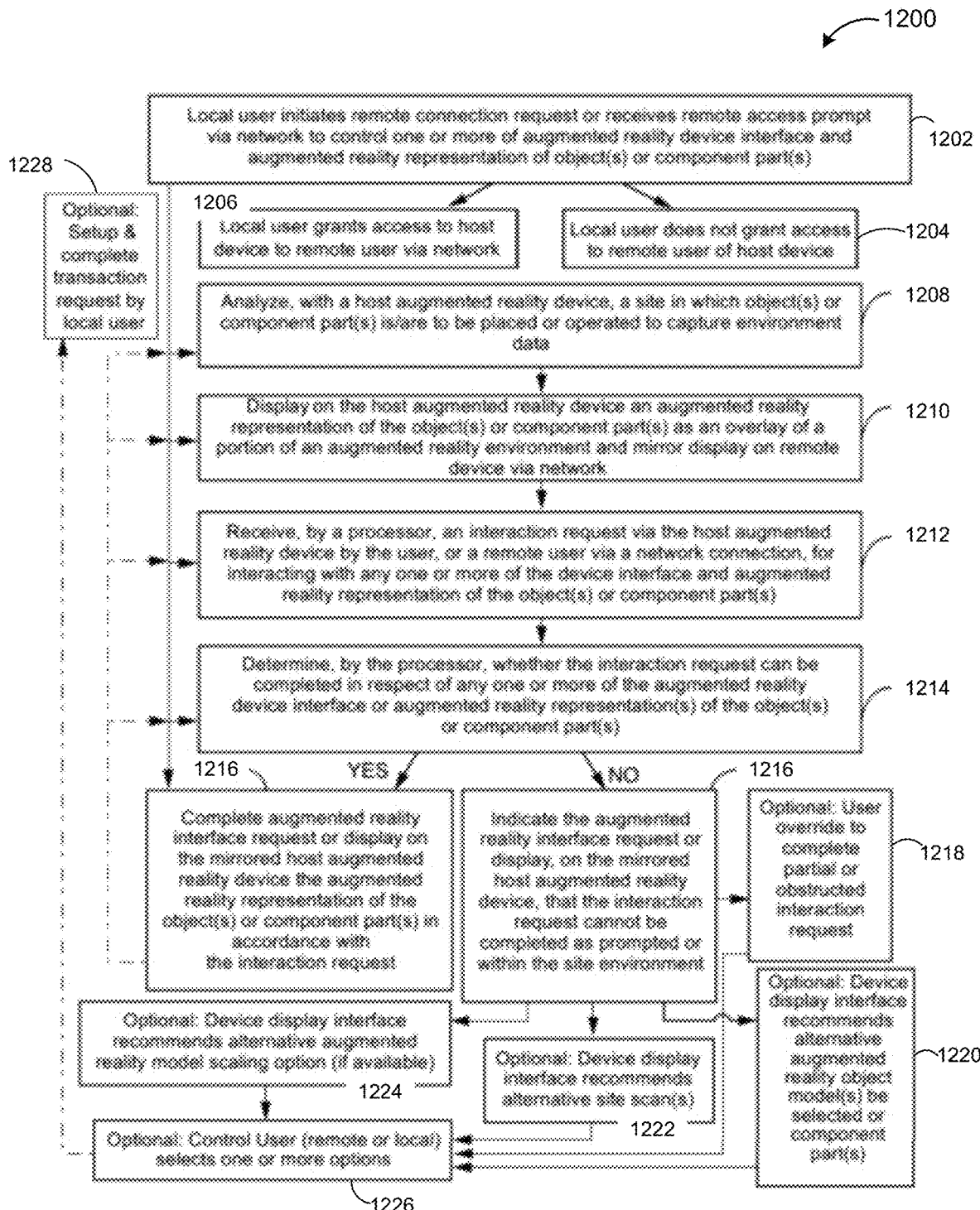
FIG. 12 shows an example flowchart illustrating an example method for dynamically interacting with an augmented reality environment in accordance with an example embodiment.

FIG. 12 shows an example flowchart 1200 illustrating an example method for dynamically interacting with an augmented reality environment in accordance with an example embodiment. Example steps 1202 to 1228 are shown in FIG. 12.

In some embodiments, the dynamic interaction system 120 can receive a connection request via the network 140 from a remote device to access the augmented reality device 110. The connection request can be received following a remote connection request generated from the augmented reality device (e.g., when the user requests for support from a remote party). The dynamic interaction system 120 can authenticate the connection request to determine whether to grant the remote device access to the augmented reality device 110. The authentication may be based on a permission given by a user via the augmented reality device 110. In response to authenticating the connection request, the dynamic interaction system 120 can operate to mirror a display of the remote device with a display of the augmented reality device 110 and proceed to receive an interaction request from a remote user via the remote device for interacting with the augmented reality representation of the object.

In some embodiments, the connection request can include a request to access one or more augmented reality devices 110, and in response to authenticating the connection request to at least two augmented reality devices 110, the dynamic interaction system 120 can synchronize the interaction request received from the remote device at the at least two augmented reality devices 110.

The dynamic interaction system 120 can also receive via the remote device an interaction request involving a support input, such as technical, operational, customer and/or sales, for facilitating an interaction request received at the augmented reality device 110. In some embodiments, the dynamic interaction system 120 can offer at the augmented reality device 110 advertisements and/or promotions triggered by the remote user via the remote device. The promotions can be offered to the user at the augmented reality device 110 due to a technical difficulty encountered, for example.

It will be appreciated that numerous specific details are described herein in order to provide a thorough understanding of the example embodiments described. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the drawings, it will be understood that the illustrated user interface text and controls are provided as examples only and are not meant to be limiting. Other suitable user interface elements may be possible.

We claim:

1. A method for dynamically interacting with an augmented reality environment via an augmented reality device, the method comprising:
    analyzing, with the augmented reality device, a site in which an object is to be placed to capture environment data related to the site;
    displaying on the augmented reality device an augmented reality representation of the object as an overlay of a portion of the augmented reality environment corresponding to the site;
    automatically detecting one or more site limitations restricting one or more interaction requests for interacting with the augmented reality representation of the object within the site;
    in response to detecting the one or more site limitations, generating a recommendation on the augmented reality device for avoiding restricting the one or more interaction requests for interacting with the augmented reality representation of the object; and
    receiving an active interaction request via the augmented reality device for interacting with the augmented reality representation of the object and displaying, on the augmented reality device, the augmented reality representation of the object in accordance with the active interaction request.

2. The method of claim 1, wherein automatically detecting the one or more site limitations restricting the one or more interaction requests comprises:
    determining an operating range of the object;
    determining whether the operating range exceeds a site boundary of the site; and
    in response to determining that the operating range exceeds the site boundary, identifying an exceeded boundary as a site limitation of the one or more site limitations.

3. The method of claim 1, wherein automatically detecting the one or more site limitations restricting the one or more interaction requests comprises:
    displaying on the augmented reality device at least one cause of the one or more site limitations.

4. The method of claim 3 further comprises:
    receiving an override input, via the augmented reality device, to disregard at least one site limitations of the one or more site limitations.

5. The method of claim 1, wherein generating the recommendation on the augmented reality device for avoiding restricting the one or more interaction requests for interacting with the augmented reality representation of the object comprises:
    determining one or more alternative objects that are suitable for the site; and
    recommending the one or more alternative objects for the site.

6. The method of claim 5 further comprises determining the one or more alternative objects based on one or more of a user preference and a historical user data.

7. The method of claim 1, wherein generating the recommendation on the augmented reality device for avoiding restricting the one or more interaction requests for interacting with the augmented reality representation of the object comprises:
    recommending that the site be analyzed again with the augmented reality device.

8. The method of claim 1, wherein generating the recommendation on the augmented reality device for avoiding restricting the one or more interaction requests for interacting with the augmented reality representation of the object comprises:
    determining one or more alternative sites suitable for the object based on historical site data; and
    recommending the one or more alternative sites.

9. The method of claim 8 further comprises recommending the one or more alternative sites based on one or more of a user preference and a historical user data.

10. The method of claim 1, wherein generating the recommendation on the augmented reality device for avoiding restricting the one or more interaction requests for interacting with the augmented reality representation of the object comprises:
    automatically adjusting a size of the augmented reality representation of the object to be suitable for the site.

11. The method of claim 1, wherein generating the recommendation on the augmented reality device for avoiding restricting the one or more interaction requests for interacting with the augmented reality representation of the object comprises:
    generating one or more directional prompts to navigate a user operating the augmented reality device to avoid the one or more site limitations.

12. The method of claim 1, wherein the object comprises a merchandisable item.

13. The method of claim 1 further comprises receiving a transaction request for the object via the augmented reality device.

14. The method of claim 1, wherein the object comprises machinery and the one or more interaction requests comprises:
    operating a component of the augmented reality representation of the machinery, the operation of the component of the augmented reality representation corresponding to a real-life operation of the component within the site.

15. The method of claim 14, wherein generating the recommendation on the augmented reality device for avoiding restricting the one or more interaction requests for interacting with the augmented reality representation of the object comprises:
    recommending an alternative component compatible for the machinery and suitable for the site.

16. A system for dynamically interacting with an augmented reality environment via an augmented reality device, the system comprising a processor operable to:
    analyze a site in which an object is to be placed to capture environment data related to the site;
    display on the augmented reality device an augmented reality representation of the object as an overlay of a portion of the augmented reality environment corresponding to the site;

automatically detect one or more site limitations restricting one or more interaction requests for interacting with the augmented reality representation of the object within the site;

in response to detecting the one or more site limitations, generate a recommendation on the augmented reality device for avoiding restricting the one or more interaction requests for interacting with the augmented reality representation of the object; and receive an active interaction request via the augmented reality device for interacting with the augmented reality representation of the object and display, on the augmented reality device, the augmented reality representation of the object in accordance with the active interaction request.

17. The system of claim 16, wherein the processor is operable to:

determine an operating range of the object;

determine whether the operating range exceeds a site boundary of the site; and in response to determining that the operating range exceeds the site boundary, identify an exceeded boundary as a site limitation of the one or more site limitations.

18. The system of claim 16, wherein the processor is operable to display on the augmented reality device at least one cause of the one or more site limitations.

19. The system of claim 18, wherein the processor is operable to receive an override input, via the augmented reality device, to disregard at least one site limitations of the one or more site limitations.

20. The system of claim 16, wherein the processor is operable to:

determine one or more alternative objects that are suitable for the site; and recommend the one or more alternative objects for the site.

21. The system of claim 20, wherein the processor is operable to determine the one or more alternative objects based on one or more of a user preference and a historical user data.

22. The system of claim 16, wherein the processor is operable to recommend that the site be analyzed again with the augmented reality device.

23. The system of claim 16, wherein the processor is operable to:

determine one or more alternative sites suitable for the object based on historical site data; and recommend the one or more alternative sites.

24. The system of claim 23, wherein the processor is operable to recommend the one or more alternative sites based on one or more of a user preference and a historical user data.

25. The system of claim 16, wherein the processor is operable to adjust a size of the augmented reality representation of the object to be suitable for the site.

26. The system of claim 16, wherein the processor is operable to generate one or more directional prompts to navigate a user operating the augmented reality device to avoid the one or more site limitations.

27. The system of claim 16, wherein the object comprises a merchandisable item.

28. The system of claim 16, wherein the processor is operable to receive a transaction request for the object via the augmented reality device.

29. The system of claim 16, wherein the object comprises machinery and the processor is operable to operate a component of the augmented reality representation of the machinery, the operation of the component of the augmented reality representation corresponding to a real-life operation of the component within the site.

30. The system of claim 29, wherein the processor is operable to recommend an alternative component compatible for the machinery and suitable for the site.

* * * * *